United States Patent
Osuna Ibarra et al.

(10) Patent No.: US 11,778,573 B2
(45) Date of Patent: *Oct. 3, 2023

(54) PREDICTIVE WIRELESS FEEDBACK CONTROL LOOPS

(71) Applicant: Intel Corporation, Santa Clara, CA (US)

(72) Inventors: Linda Patricia Osuna Ibarra, Zapopan (MX); David Gómez Gutiérrez, Tlaquepaque (MX); Dave Cavalcanti, Portland, OR (US); David Arditti Ilitzky, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,829

(22) Filed: Sep. 20, 2021

(65) Prior Publication Data

US 2022/0217659 A1 Jul. 7, 2022

Related U.S. Application Data

(63) Continuation of application No. 16/455,452, filed on Jun. 27, 2019, now Pat. No. 11,129,117.

(51) Int. Cl.
*H04W 56/00* (2009.01)
*H04W 24/02* (2009.01)
(Continued)

(52) U.S. Cl.
CPC ....... *H04W 56/001* (2013.01); *H04L 43/0823* (2013.01); *H04L 43/0858* (2013.01);
(Continued)

(58) Field of Classification Search
CPC ............... H04L 41/147; H04L 43/0823; H04L 43/0858; H04L 43/106; H04L 43/16;
(Continued)

(56) References Cited

U.S. PATENT DOCUMENTS 6,243,610 B1 6/2001 Iino et al.
11,129,117 B2 9/2021 Ibarra et al.
(Continued)

FOREIGN PATENT DOCUMENTS

FR 2861191 A1 4/2005

OTHER PUBLICATIONS

ISA100, Wireless Systems for Automation, ISA, 15 pages, retrieved from https://www.isa.org/isa100/ on Jun. 18, 2019.
(Continued)

*Primary Examiner* — Khoa Huynh
(74) *Attorney, Agent, or Firm* — HANLEY, FLIGHT & ZIMMERMAN, LLC

(57) ABSTRACT

Example predictive wireless feedback control systems disclosed herein include a receiver to receive measurements of a controlled system via a first wireless link. Disclosed example systems also include an observer to output estimated values of states of the controlled system based on a state space model that is updated based on the measurements. Disclosed example system further include a predictor to predict future values of the states of the controlled system based on the estimated values of the states, a first latency of the first wireless link and an upper limit of a second latency associated with a second wireless link that is to communicate values of a control signal to an actuator associated with the controlled system. In disclosed examples, the predictor is to output the predicted future values of the states to a controller that is to determine the control signal.

20 Claims, 15 Drawing Sheets

(51) Int. Cl.
*H04L 43/0852* (2022.01)
*H04L 43/0823* (2022.01)
*H04L 43/106* (2022.01)
*H04W 24/08* (2009.01)

(52) U.S. Cl.
CPC ........... *H04L 43/106* (2013.01); *H04W 24/02* (2013.01); *H04W 24/08* (2013.01)

(58) Field of Classification Search
CPC ..... H04W 24/02; H04W 24/04; H04W 24/08; H04W 56/001
See application file for complete search history.

(56) References Cited

U.S. PATENT DOCUMENTS

| | | | |
|---|---|---|---|
| 2002/0116154 A1* | 8/2002 | Nowak | H04L 43/0852 702/186 |
| 2014/0112164 A1* | 4/2014 | Wigren | H04W 72/54 370/252 |
| 2014/0201259 A1* | 7/2014 | Bai | H04L 67/75 709/203 |
| 2014/0249653 A1 | 9/2014 | Blevins et al. | |
| 2015/0304193 A1 | 10/2015 | Ishii et al. | |
| 2019/0279100 A1 | 9/2019 | Cline | |
| 2019/0332918 A1 | 10/2019 | Gutierrez et al. | |
| 2019/0394735 A1 | 12/2019 | Osuna Ibarra et al. | |

OTHER PUBLICATIONS

ISA100.11a, Wikipedia, 2 pages, retrieved from https://en.wikipedia.org/w/index.php?title=ISA100 11a&oldid=883273397, last edited Feb. 14, 2019.
How HART Works, HART Communication Protocol, 2019,10 pages, retrieved from https://fieldcommgroup.org/technologies/hart/hart-technology-detail on Jun. 18, 2019.
Nirelesshart, Wikipedia, 4 pages, retrieved from https://en.wikipedia.org/w/index.php?title=WirelessHART&oldid=877576584, last edited Jan. 9, 2019.
Wireless Industrial Networking Alliance, Wikipedia, 1 page, retrieved from https://en.wikipedia.org/w/index.php?title=Wireless_Industrial_Networking_Alliance&oldid=691194527, last edited Nov. 18, 2015.
Zigbee, Wikipedia, 12 pages, retrieved from https://en.wikipedia.org/w/index.php?title=Zigbee&oldid=900629663, last edited Jun. 6, 2019.
Cavalcanti et al., "Extending Accurate Time Distribution and Timeliness Capabilities Over the Air to Enable Future Wireless Industrial Automation Systems," Proceedings of the IEEE, pre-publication version accepted Feb. 26, 2019, 21 pages.
Zheng et al., "Delay Estimation via Sliding Mode for Nonlinear Time-Delay Systems," HAL, Nov. 27, 2017, 9 pages.
Ball Balancing Table, Acrome Robotics, 2 pages, retrieved on Jun. 18, 2019.
Ashraf et al., "Ultra-Reliable and Low-Latency Communication for Wireless Factory Automation: From LTE to 5G," IEEE 21st International Conference on Emerging Technologies and Factory Automation, 2016, 8 pages.
Sanz et al., "Predictor-Based Control of a Class of Time-Delay Systems and its Application to Quadrotors," IEEE Transactions on Industrial Electronics, Sep. 2016, 11 pages.
Peng et al., "Predictor-Based Neural Dynamic Surface Control for Uncertain Nonlinear Systems in Strict-Feedback Form," IEEE Transactions on Neural Networks and Learning Systems, vol. 28, No. 9, Sep. 2017, 12 pages.
Choi et al., "Neural network-based Smith predictor design for the time-delay in a tele-operated control system," Artificial Life and Robotics, vol. 14, No. 4, 2009, 6 pages.
Huang et al., "Neural-Network Predictive Control for Nonlinear Dynamic Systems With Time-Delay," IEEE Transactions on Neural Networks, vol. 14, No. 2, Mar. 2003, 13 pages.
D.L. Mills, (1985) Network Time Protocol from IETF.org: https://www.ietf.org/rfc/rfc0985.txt, retrieved on Oct. 1, 2021, 10 pages.
Dierks et al., "Output Feedback Control of a Quadrotor UAV Using Neural Networks," IEEE Transactions on, Neural Networks, vol. 21, No. 1, Jan. 2010: 50-66, 17 pages.
Lawrynczuk, M., "Neural Networks in Model Predictive Control," N.T. Nguyen and E. Szczerbicki (Eds): Intel Sys. for Know. Management, SCI 252, pp. 31-63, 33 pages (Year: 2009).
Jin et al., "Adaptive Model Predictive Control Using Diagonal Recurrent Neural Network," 2008 Fourth International Conference on Natural Computation, 5 pages (Year: 2008).
Na et al., "Adaptive neural network predictive control for nonlinear pure feedback systems with input delay," Journal of Process Control, 22.1: 194-206, 13 pages (Year: 2012).

\* cited by examiner

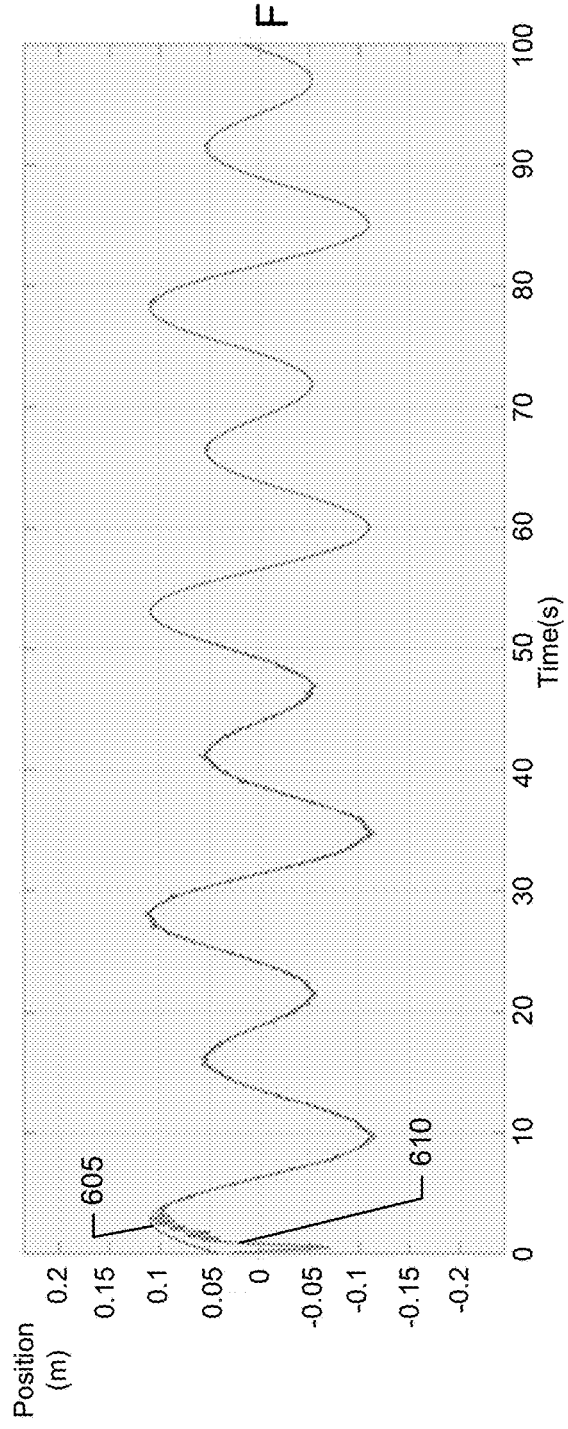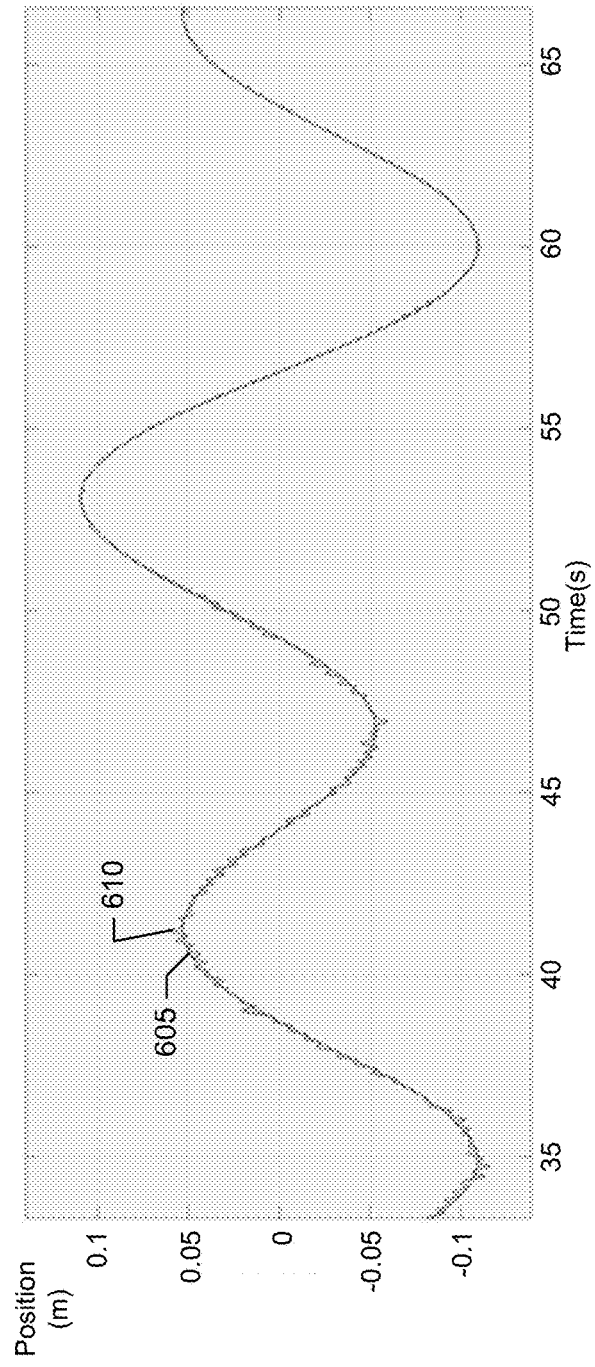

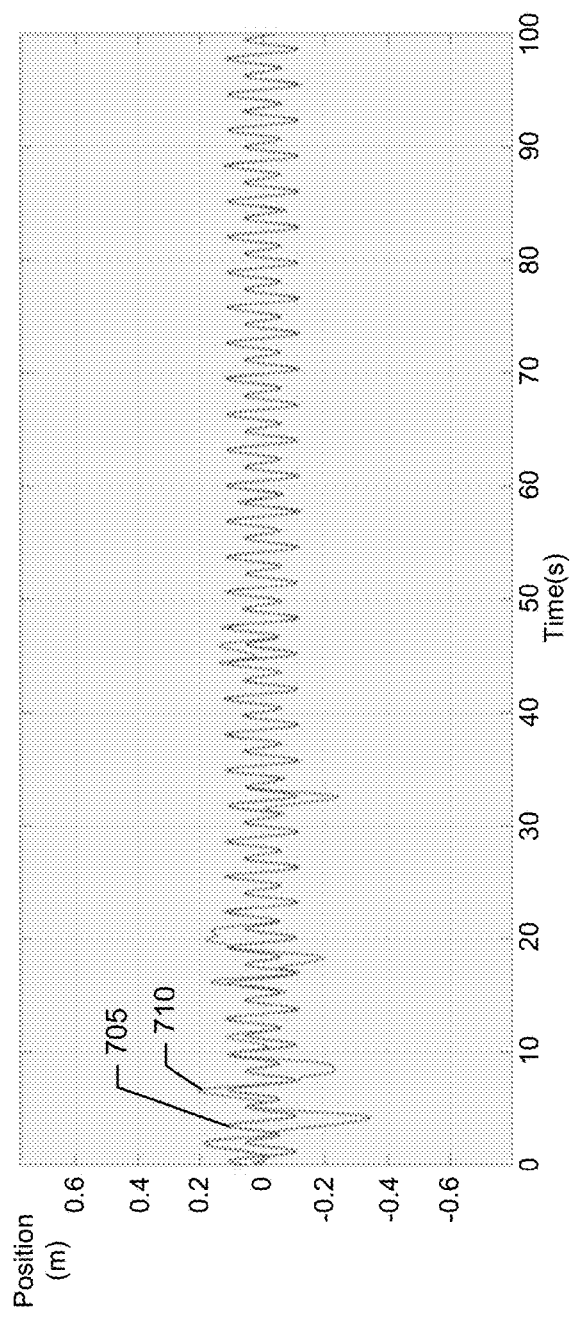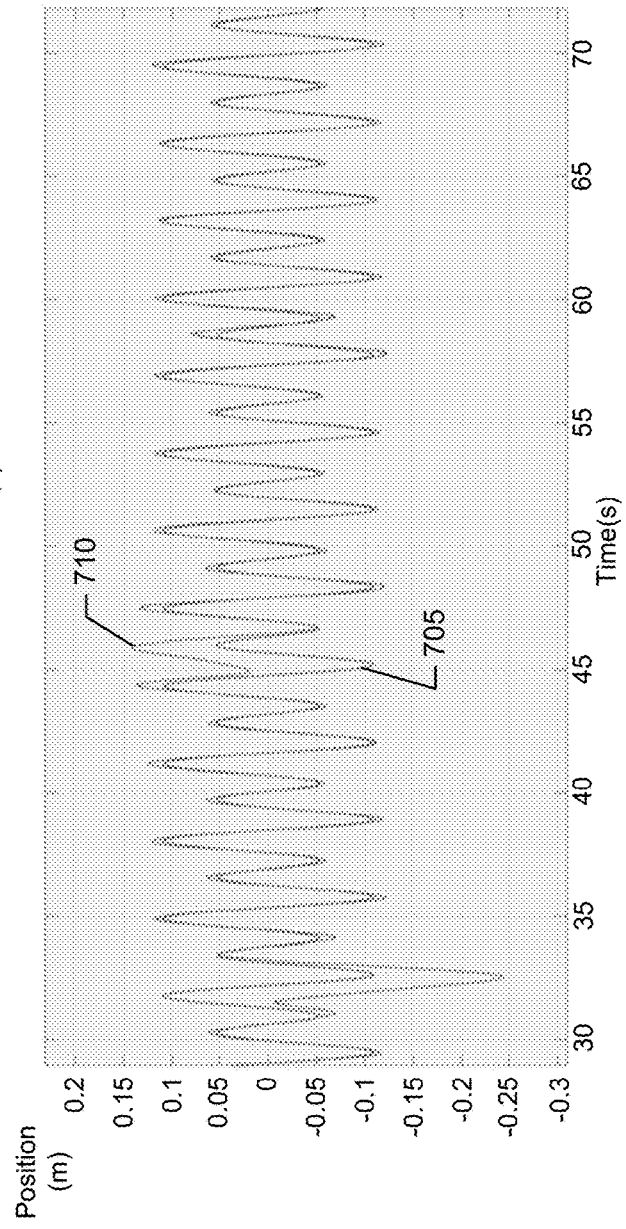

PREDICTIVE WIRELESS FEEDBACK CONTROL LOOPS

RELATED APPLICATION(S)

This patent arises from a continuation of U.S. patent application Ser. No. 16/455,452 (now U.S. Pat. No. 11,129, 117), titled "PREDICTIVE WIRELESS FEEDBACK CONTROL LOOPS," and filed on Jun. 27, 2019. U.S. patent application Ser. No. 16/455,452 is incorporated herein by reference in its entirety. Priority to U.S. patent application Ser. No. 16/455,452 is hereby claimed.

FIELD OF THE DISCLOSURE

This disclosure relates generally to control loops and, more particularly, to predictive wireless feedback control loops.

BACKGROUND

Feedback control systems in industrial applications typically include a controller to generate a control signal to be applied to an actuator, which is to adjust an input of a target system, such as a plant, being controlled. The controller generates the control signal based on one or more measured outputs of the plant and reference value(s) that represent the corresponding desired output(s) of the plant. Prior feedback control systems often rely on wired networks to convey the control signal from the controller to the actuator, and to convey the measured output(s) of the plant to the controller.

BRIEF DESCRIPTION OF THE DRAWINGS

FIGS. 6A-7B illustrate example operational results obtained by an example observer and predictor implementation in the example predictive wireless feedback control system of FIG. 2.

Figure 1:
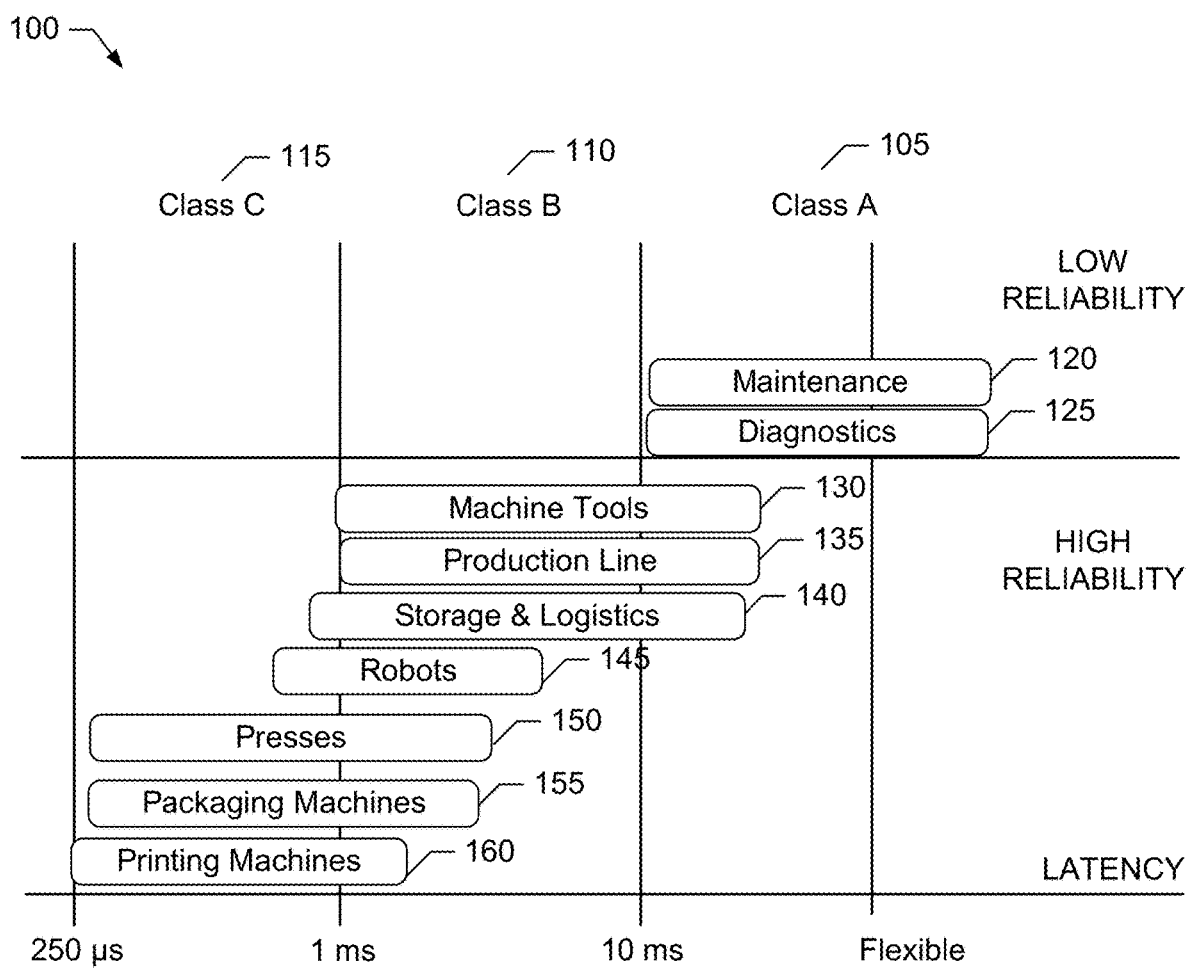
FIG. 1 is a graph illustrating example latency and reliability requirements for different types of industrial systems to be controlled by a feedback control system.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to implement predictive wireless feedback control loops are disclosed herein. Example predictive wireless feedback control systems disclosed herein include a receiver to receive measurements of a controlled system via a wireless sensing link (e.g., a first wireless link). Disclosed example systems also include an observer to output estimated values of states of the controlled system based on a state space model of the controlled system that is updated based on the measurements. Disclosed example systems further include a predictor to predict future values of the states of the controlled system based on the estimated values of the states of the controlled system from the observer, a first latency of the wireless sensing link and an upper limit of a second latency associated with a wireless actuation link (e.g., a second wireless link), the wireless actuation link to communicate values of a control signal to an actuator associated with (e.g., that is to actuate an input of) the controlled system. In some disclosed examples, the predictor is to output the predicted future values of the states of the controlled system to a controller that is to determine the control signal that is to be communicated via the second wireless link.

In some example predictive wireless feedback control system disclosed herein, the wireless sensing link and the wireless actuation link are implemented by a wireless time sensitive network that is to provide time synchronization between the receiver and a transmitter that is to transmit the measurements of the controlled system to the receiver via the wireless sensing link. In some such examples, the measurements include a first measurement, and the receiver is to receive the first measurement in a first message from the transmitter via the wireless sensing link. The first message is to include a timestamp to identify a first time at which the transmitter transmitted the first message. In some such examples, the receiver is to determine a second timestamp to identify a second time at which the receiver received the first message, and at least one of the observer or the predictor is to determine the first latency based on the first timestamp and the second timestamp. In some such examples, the upper limit of the second latency associated with the wireless actuation link is a configuration parameter based on the wireless time sensitive network.

In some example predictive wireless feedback control system disclosed herein, the observer is to determine whether unprocessed measurements are available at a time when the state space model is to be updated. If the unprocessed measurements are available, the observer is to determine error values based on differences between observed values of the controlled system and the corresponding estimated values of the states of the controlled system, and is to update the state space model based on the error values. In some such examples, the observed values of the controlled system are based on the unprocessed measurements. However, if the unprocessed measurements are not available, the observer does not update the state space model.

In some example predictive wireless feedback control system disclosed herein, the predictor is to predict the future values of the states of the controlled system based on the estimated values of the states of the controlled system and output values of the state space model. In some such examples, the output values of the state space model are determined based on values of the control signal determined by the controller for application to the actuator during a window of time starting at a first time associated with a most recent measurement of the controlled system from the wireless sensing link. In some such examples, the window of time has a duration corresponding to a sum of the first latency of the wireless sensing link and the upper limit of the second latency associated with a wireless actuation link.

In some example predictive wireless feedback control system disclosed herein, the receiver is a first receiver, and the system includes a transmitter to transmit the values of the control signal to the actuator via the wireless actuation link. In some such examples, the transmitter includes a scheduler to adjust a number of retries to be performed to transmit messages including the values of the control signal via the wireless actuation link. In some such examples, the scheduler is to adjust the number of retries based on transmission errors reported by a second receiver that is to receive the messages.

In some example predictive wireless feedback control system disclosed herein, the controller is to implement a proportional, derivative and integral control algorithm based on corresponding proportional, derivative and integral control coefficients. In some such examples, the controller is to determine values of the proportional, derivative and integral control coefficients based on a function that is to raise a magnitude of an error by an exponent. In some such examples, the error based on the predicted future values of the states of the controlled system and a reference state of the controlled system.

These and other example methods, apparatus, systems and articles of manufacture (e.g., physical storage media) to implement predictive wireless feedback control loops are disclosed in further detail below.

As mentioned above, prior feedback control systems often rely on wired networks to convey a control signal from a controller to an actuator that is to adjust an input of the system being controlled, such as a plant or, more generally, any controlled system, such as those listed in FIG. 1. Such prior feedback control systems may also rely on wired networks to convey one or more measured outputs of the controlled system back to the controller, which uses the measured output(s) and reference value(s) that represent the corresponding desired output(s) of the plant to generate the control signal to be provided to the actuator. However, it may be desirable to replace the wired network used in prior feedback control systems with one or more wireless networks to, for example, reduce installation cost/complexity, enhance flexibility/mobility of the elements of the feedback control system, etc.

The replacement of wired networks with wireless networks may be relatively straightforward for controlled systems that have slow dynamics and can tolerate a large control time-constant, and/or can have low reliability requirements. However, replacement of wired networks with wireless networks for controlled systems that have fast dynamics and thus require a small control time-constant, and/or have high reliability requirements, is more challenging because, for example, a wireless network can introduce time delays or, in other words, latency in the sensing and/or actuation of the feedback control system. Such time delays (or latencies) can result in performance degradation, or even instability, in the feedback control system.

A graph 100 illustrating example latency and reliability requirements for different types of industrial systems to be controlled by a feedback control system is provided in FIG. 1. The graph 100 of FIG. 1 illustrates three (3) example classes of controlled systems, labelled Class A (also corresponding to reference numeral 105), Class B (also corresponding to reference numeral 110) and Class C (also corresponding to reference numeral 115), with different latency and reliability requirements. Class A represents a first class of controlled systems that have slow dynamics (e.g., high time-constant) and can tolerate low reliability, which include systems such as maintenance systems 120, diagnostic systems 125, etc. Class B represents a second class of controlled systems that have faster dynamics (e.g., lower time-constant) than the Class A systems, and require higher reliability than the Class A systems, which include systems such as machine tools 130, production lines 135, storage and logistics systems 140, industrial robots 145, etc. Class C represents a third class of controlled systems that have high dynamics (e.g., low time-constant) and require high reliability, which include systems such as industrial presses 150, packaging machines 155, printing machines 160, etc.

Prior techniques for migrating feedback control systems, such as those in the areas of industrial automation and manufacturing, focus on the Class A controlled systems described above, which can tolerate high latency (e.g., are characterized by slow dynamics/high time-constant) and low reliability. However, such techniques typically cannot meet the low latency requirements of the Class B and C controlled systems described above, and/or other latency-sensitive and reliability-sensitive controlled systems, such as remote-controlled drones, etc. Prior attempts to migrate feedback control systems for such latency-sensitive and/or reliability-sensitive controlled systems to wireless networks focus on reducing the latency and improving the reliability of the wireless networks, but such attempts may still be insufficient to meet the latency and/or reliability requirements of the Class B and C controlled systems described above, as well as other controlled systems that are latency-sensitive and/or reliability-sensitive.

Unlike such prior feedback control techniques, example predictive feedback control solutions disclosed herein enable use of wireless networks to perform feedback control of the Class B and C controlled systems described above, as well as other controlled systems that are latency-sensitive and/or reliability-sensitive. Such example predictive feedback control solutions disclosed herein can be implemented with any existing or future wireless time sensitive network (WSTN), such as a WSTN conforming to the Institute of Electrical and Electronics Engineers (IEEE) 802.11ax standard, that provides time synchronization between wireless devices communicating in the WSTN. As described in further detail below, such time synchronization can be provided by timestamps included with transmitted messages, a synchronized real time clock (RTC) source provided by the WSTN, etc.

As disclosed in further detail below, some example predictive feedback control solutions implemented in accordance with the teachings of this disclosure include an example observer and an example predictor that operate in combination to prevent performance degradation when a wireless network, which typically has larger latency than a wired network, is used instead of, or is used to replace, a wired network in the feedback control system. As disclosed in further detail below, the observer and predictor utilize information provided by the wireless devices communicating in the WSTN, such as network timing synchronization, timestamping services, and a known maximum latency of the WTSN (e.g., at least known with a target level of reliability), to process the reported output measurements of the controlled system, which may exhibit delay/latency due to the wireless network, to predict a future state of the controlled system, which can be applied to the controller that is to generate the control signal for use by the actuator that is to adjust operation of the controlled system. In some such examples, the observer and predictor of the predictive feedback control solution enable use of the same (or similar) controller that would be used with a wired network implementation.

Additionally or alternatively, some example predictive feedback control solutions disclosed herein include a controller that implements a nonlinear proportional, integral and derivative (PID) control algorithm in accordance with teachings of this disclosure. Such disclosed example nonlinear PID controllers can provide improved robustness with respect to external disturbances and time-delays, and can replace a conventional linear PID controller. In some disclosed examples, the nonlinear PID controller is combined with the observer and predictor to allow use of wireless networks in even a wider class of feedback control system applications.

Additionally or alternatively, some example predictive feedback control solutions disclosed herein include a scheduler implemented in accordance with teachings of this disclosure to adapt the reliability requirements of the messages communicated via the WSTN based on the performance of the feedback control system(s) being implemented over the WSTN. As disclosed in further detail below, such link adaptation provided by disclosed example schedulers can increase the number of feedback control systems and/or other users that can be served by the WSTN. In some disclosed examples, the scheduler is combined with the nonlinear PID controller and/or the observer/predictor to provide a robust, wireless feedback control system.

Figure 2:
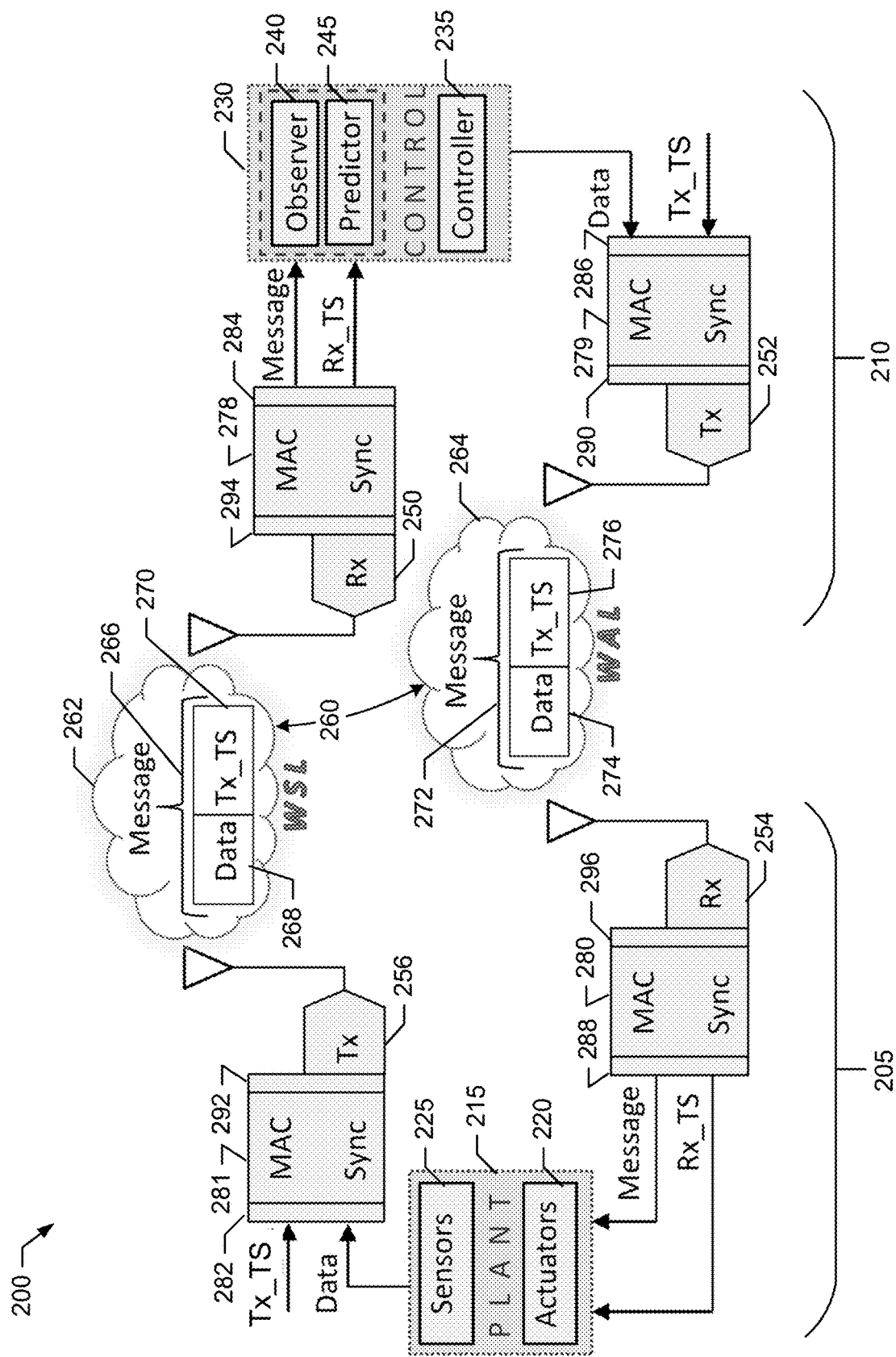
FIG. 2 is a block diagram of an example predictive wireless feedback control system implemented in accordance with teachings of this disclosure.

A block diagram of an example predictive wireless feedback control system 200 implemented in accordance with teachings of this disclosure is illustrated in FIG. 2. The wireless feedback control system 200 of the illustrated example is divided into an example target side 205 and an example control side 210. The target side 205 of the predictive wireless feedback control system 200 includes an example target system 215 to be controlled, which is also referred to herein as an example controlled system 215 or an example plant 215. The target system 215 (or controlled system 215 or plant 215) can correspond to any type(s) and/or number(s) of systems capable of being controlled by a feedback control system. For example, the target system 215 (or controlled system 215 or plant 215) can correspond to one of more of the example systems illustrated in FIG. 2, machinery operating in a factory (e.g., a conveyor belt, drill, press, robot, oven, assembly line, etc.), one or more remote controlled drones, an autonomous vehicle (e.g., a self-driving car), one or more navigation/driving systems of a vehicle (e.g., autonomous parking system, a cruise control system, a lane control system, etc.), etc.

The target system 215 of the illustrated example also includes an example actuator 220 and one or more example sensors 225. The actuator 220 of the illustrated example can correspond to any type(s) and/or number(s) of actuators capable of adjusting one or more inputs of the target system 215. For example, the actuator 220 can include one or more servos, pumps, relays, valves, motors, switches, power supplies, nozzles, injectors, ports, restrictors, etc., to adjust one or more of the inputs of the target system 215. The sensor(s) 225 of the illustrated example can correspond to any type(s) and/or number(s) of sensor(s) capable of measuring one or more outputs of the target system 215. For example, the sensor(s) 225 can include one or more voltage sensors, current sensors, optical sensors, position sensors, pressure sensors, thermal sensors, accelerometers, velocity sensors, etc.

The control side 210 of the predictive wireless feedback control system 200 includes an example predictive feedback control solution 230, which includes an example controller 235, an example observer 240 and an example predictor 245. The controller 235 of the illustrated example can correspond to any type(s) and/or number(s) of controller(s) capable of generating control signal(s) to be provided to the actuator 220. In some examples, the controller 235 is implemented by a logic circuit that performs a conventional proportional control algorithm, a conventional integral control algorithm, a conventional derivative control algorithm, or any combination thereof. In some examples, the controller 235 implements a nonlinear PID control algorithm in accordance with teachings of this disclosure.

The observer 240 and the predictor 245 of the illustrated example are not human beings but are instead implemented by, for example, software and/or hardware. The observer 240 and the predictor 245 operate in combination to implement predictive feedback control in accordance with the teachings of this disclosure. Further details concerning the observer 240 and the predictor 245 are provided below.

In the illustrated example of FIG. 2, wireless aspects of the predictive wireless feedback control system 200 are implemented by an example control-side receiver 250, an example control-side transmitter 252, an example target-side receiver 254 and an example target-side transmitter 256. The target-side transmitter 256 and the control-side receiver 250 of the illustrated example communicate via an example WTSN 260 to implement an example wireless sensing link (WSL) 262. Likewise, the control-side transmitter 252 and the target-side receiver 254 of the illustrated example communicate via the WTSN 260 to implement an example wireless actuation link (WAL) 264. For example, the WSL 262 can correspond to any protocol defining message formats, message timing, etc., by which the target-side transmitter 256 transmits example sensor messages 266 to the control-side receiver 250. In the illustrated example, an example sensor message 266 includes an example data payload 268 and an example transmit timestamp 270. The example data payload 268 includes sampled values of measurement(s) taken by the sensor(s) 225, and the transmit timestamp 270 is a timestamp representing the time at which the target-side transmitter 256 transmitted the sensor message 266. Likewise, the WAL 264 can correspond to any protocol defining message formats, message timing, etc., by which the control-side transmitter 252 transmits example actuation messages 272 to the target-side receiver 254. In the illustrated example, an example actuation message 272 includes an example data payload 274 and an example transmit timestamp 276. The example data payload 274 includes sampled values of control signal(s) generated by the controller 235, and the transmit timestamp 276 is a timestamp representing the time at which the control-side transmitter 252 transmitted the actuation message 272.

The WTSN 260 of the illustrated example can correspond to any number(s) and/or types(s) of WSTNs capable of (i) ensuring time synchronization among the control-side receiver 250, the control-side transmitter 252, the target-side receiver 254 and the target-side transmitter 256, and (ii) meeting a target, maximum expected communication latency (e.g., in terms of seconds, milliseconds, microseconds, etc.) with a target level of reliability (e.g., in terms of a percentage, such as 99%, 95% etc.). For example, such time synchronization and maximum expected communication latency requirements can be met by the IEEE 802.1AS synchronization feature enabled by the IEEE 802.11 timing measurement capability of an IEEE 802.11ax network. In such examples, the control-side receiver 250, the control-side transmitter 252, the target-side receiver 254 and the target-side transmitter 256 include respective, example medium access control (MAC) synchronizers 278, 279, 280 and 281 to implement WSTN synchronization, such as the IEEE 802.1AS synchronization feature of an IEEE 802.11ax network As disclosed in further detail below, the example observer 240 implements a state space model that uses measurement values of the target system 215 received in the sensor messages 266 to estimate the observable state of the target system 215. In some examples, the state space model is implemented by an executable software construct, such computer executable instructions in combination with one or more adjustable parameters, which mimics the same input-output behavior of the target system 215 such that observer 240 can be viewed as providing a synchronized, virtual copy (albeit estimated) of the state of the target system 215. However, because there is latency associated with the communication of the sensor messages 266 over the WSL 262 implemented over the WSTN 260, the measurement values of the target system 215 are delayed by a sensing link latency, $\tau_s$, of the WSL 262, which may be random. Thus, the estimated state output from the observer 240 is a delayed estimate of the actual state of the target system 215 at an earlier time $t-\tau_s$, where $\tau_s$ is the random sensing link latency.

In some examples, the example predictor 245 is implemented by an executable software construct, such computer executable instructions in combination with one or more adjustable parameters, which accounts for the communication latencies exhibited by the wireless feedback control system 200 to predict a future state of the target system 215 that can be applied to the controller 235 to cause the controller 235 to generate an appropriate control signal corresponding to what the state of the target system 215 is expected to be at the time the control signal ultimately reaches the target system 215 (e.g., reaches the actuator 220). As noted above, there is a random sensing link latency, $\tau_s$, associated with the communication of the sensor messages 266 over the WSL 262 implemented over the WSTN 260. In some examples, there is also an actuation link latency, $\tau_a$, associated with the communication of the actuation messages 272 over the WAL 264 implemented over the WSTN 260. In such examples, to enable the controller 235 to apply the appropriate correction action, the predictor 245 starts with the estimated state of the target system 215 output from the observer 240 and evolves, or in other words, predicts the system state in the future by an amount of time corresponding to $\tau_s+\tau_a$ relative to the time associated with the estimated state of the target system 215 output from the observer 240. As disclosed in further detail below, the predictor 245 uses the state space model of the target system 215 and a history of control signal values sent to the target system 215 (e.g., to the actuator 220), to predict what the actual state of the target system 215 will be at the moment the actuator 220 is to apply an actuation based on the control signal that is currently being generated by the controller 235.

In this way, the combination of the observer 240 and the predictor 245 may provide an estimate of the state of the system between available measurement values and also overcome delays (e.g., up to a known maximum latency) in the messages 266 and 272 being communicated wirelessly in the wireless feedback control system 200. This allows the controller 215 to actuate at higher frequencies, similar to those in a feedback control system implemented with a wired network. In the illustrated example, the observer 240 and the predictor 245 are located logically between the control-side receiver 250 and the controller 215. In some examples, the observer 240 and/or the predictor 245 are integrated with the controller 215, for example, as one or more software processes implemented on the same processor (e.g., central processing unit—CPU) implementing the controller 215, as one or more software and/or firmware processes implemented on the same digital signal processor (DSP) implementing the controller 215, as one or more firmware processes implemented by a microcontroller (e.g., microcontroller unit—MCU) implementing the controller 215, etc. In some examples, the observer 240 and/or the predictor 245 are implemented in a device that is separate from the controller 215. In some examples, the observer 240 and/or the predictor 245 are implemented as part of the MAC layer in one or more of the wireless transceivers included in the control side of the predictive wireless feedback control system 200. For example, the observer 240 and/or the predictor 245 could be implemented by the control-side receiver 250, the control-side transmitter 252, the target-side receiver 254 and/or the target-side transmitter 256, such as in one or more of the MAC synchronizers 278, 279, 280 and/or 281 included in the control-side receiver 250, the control-side transmitter 252, the target-side receiver 254 and/or the target-side transmitter 256.

In the illustrated example, the wireless feedback control system 200 determines the wireless communication latencies and, in some examples, determines when to apply control signal values to the actuator 220, based on the timestamps 270 and 276 included in the messages 266 and 272. As such, the target-side transmitter 256 includes an example transmit timestamper 282 to timestamp the sensor messages 266 with the timestamps 270, which indicate the respective times at which the measurements contained in the data payloads 268 of the respective sensor messages 266 were transmitted. The control-side receiver 250 includes an example receive timestamper 284 to add a receive timestamp to a given sensor message 266 when it is received by the control-side receiver 250. By taking the difference between the receive timestamp determined by the receive timestamper 284 and the transmit timestamp 270 included in a given sensor message 266, the observer 240 and/or the predictor 245 can determine the sensing link latency, $\tau_s$, of the WSL 262. As disclosed above and in further detail below, the observer 240 and/or the predictor 245 use the calculated sensing link latency, $\tau_s$, to predict a future state of the target system 215 relative to an estimated state corresponding to the measurement included in the given sensor message 266.

Similarly, in some examples, the client-side transmitter 252 includes an example transmit timestamper 286 to timestamp the actuation messages 272 with the timestamps 276, which indicate the respective times at which the control signal values contained in the data payloads 274 of the respective actuation messages 272 were transmitted. The target-side receiver 254 includes an example receive timestamper 288 to add a receive timestamp to a given actuation message 272 when it is received by the target-side receiver 254. By taking the difference between the receive timestamp determined by the receive timestamper 288 and the transmit timestamp 276 included in a given actuation message 272, the actuator 220 can determine the actuation link latency, $\tau_a$, of the WAL 264. As disclosed in further detail below, in some example, the actuator 220 uses the calculated actuation link latency, $\tau_a$, to determine when to use the control signal value received in the given actuation message 272 to adjust the input(s) to the target system 215.

In examples in which the target-side transmitter 256 does not include the transmit timestamper 282, and/or the client-side transmitter 252 does not include transmit timestamper 286, a synchronized real-time clock (RTC) can be provided to the target side 205 and/or the example control side 210 of the predictive wireless feedback control system 200 to enable determination of the communication link latencies.

In the illustrated example of FIG. 2, the client-side transmitter 252 and the target-side transmitter 256 include respective example schedulers 290 and 292, and the control-side receiver 250 and the target-side receiver 254 include respective example monitors 294 and 296. Operation of the schedulers 290 and 292 and the monitors 294 and 296 is disclosed in further detail below.

It is noted that predictive wireless feedback control, as disclosed herein, is not limited to the architecture of the example predictive wireless feedback control system 200 of FIG. 2. Rather, in some examples, some or all of the functionality disclosed above as implemented by the example predictive feedback control solution 230, the example controller 235, the example observer 240, the example predictor 245, the example MAC synchronizers 278, 279, 280 and/or 281, the example transmit timestamper 282, the example receive timestamper 284, the example transmit timestamper 286, the example receive timestamper 288, the example schedulers 290 and/or 292, and/or the example monitors 294 and/or 296 could be redistributed among different elements of the target side 205 and/or the control side 210 of the predictive wireless feedback control system 200. For example, some or all of the functionality disclosed above as implemented by the example predictive feedback control solution 230, the example controller 235, the example observer 240, the example predictor 245, the example MAC synchronizers 278, 279, 280 and/or 281, the example transmit timestamper 282, the example receive timestamper 284, the example transmit timestamper 286, the example receive timestamper 288, the example schedulers 290 and/or 292, and/or the example monitors 294 and/or 296 could be implemented as part of the target system 215 to be controlled, such as in one or more drivers provided to control the target system 215. By way of example, if the target system 215 includes a motor, some or all of the functionality disclosed above as implemented by the example predictive feedback control solution 230, the example controller 235, the example observer 240, the example predictor 245, the example MAC synchronizers 278, 279, 280 and/or 281, the example transmit timestamper 282, the example receive timestamper 284, the example transmit timestamper 286, the example receive timestamper 288, the example schedulers 290 and/or 292, and/or the example monitors 294 and/or 296 could be integrated into a driver provided for that motor to prevent, or reduce, performance degradation when using the motor in wireless networks.

Figure 3:
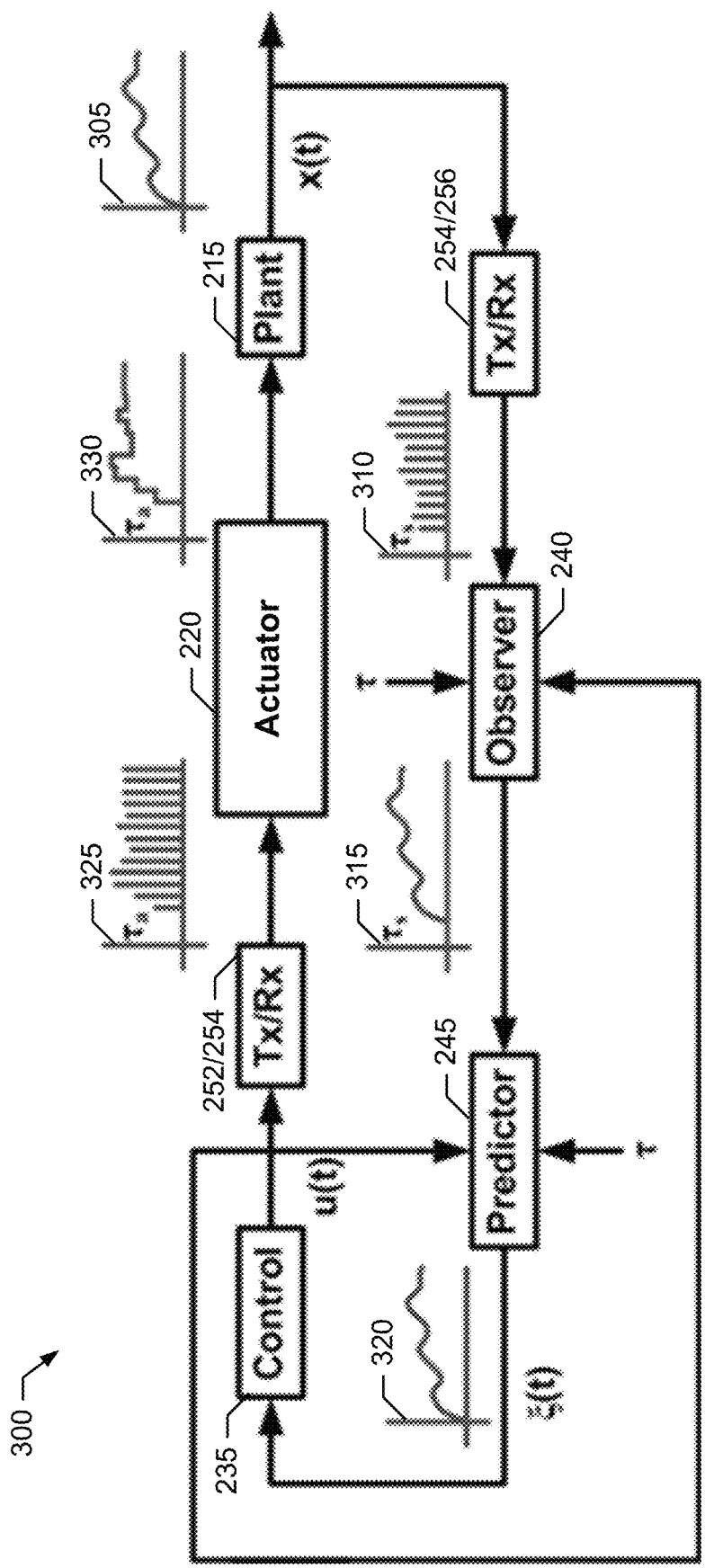
FIG. 3 illustrates an example operation of the example predictive wireless feedback control system of FIG. 2.

An example operation 300 of the predictive wireless feedback control system 200 of FIG. 2 is illustrated in FIG. 3. In the illustrated example operation 300 of FIG. 3, example measurements 305 of the output of the target system 215 are sensed (e.g., by the sensor(s) 225). The measurements 305 are represented by the signal x(t) in FIG. 3. The target-side transmitter 256 samples (digitizes) the measurements 305, encapsulates the sampled measurements 305 in the data payloads 268 of the sensor messages 266 along with the transmit timestamps 270, and transmits the messages 266 via the WSL 262 to the control-side receiver 250. The delivery of the sensor messages 266 over the WSL 262 exhibit a random delay $\tau_s$ (which may be caused by one or more factors, such as packet-errors over the wireless channel, non-deterministic access to the wireless channel, etc.). In the illustrated example, a random delay, $\tau_a$, is also exhibited on the WAL 264 for the actuation messages 272 sent by the control-side transmitter 252 to the target-side receiver 254.

When a sensor message 266 is received at the control side by the control-side receiver 250, the control-side receiver 250 adds a receive timestamp to the measurement contained in the sensor message 266 and provides the received measurement 310 to the observer 240. As shown in FIG. 3, the received measurement 310 is delayed relative to its sensed version 305 by the sensing link latency $\tau_s$. The observer 240 uses the received measurement 310 to correct its estimated state 315 of the target system 215. Accordingly, the estimated state 315 output from the observer 240 is delayed in time by the sensing link latency $\tau_s$. (In the illustrated example, the estimated state 315 output from the observer 240 is in continuous time, but with the delay $\tau_s$ remaining).

To compensate for the delays introduced by the WSL 262 and the WAL 264, the, the predictor 245 is used to forecast, as disclosed in further detail below, the future state 320 of the target system 215 at a time of $\tau_s + \tau_{a,MAX}$ in the future relative to the estimated state 315 output from the observer 240, which as noted above is delayed in time by the sensing link latency $\tau_s$. Here, $\tau_{a,MAX}$ is the maximum expected latency for the WAL 264 In some examples, the maximum expected latency for the WAL 264, $\tau_{a,MAX}$, may be a configuration parameter that is known or determinable based on characteristics of the WTSN 260 over which the WAL 264 is implemented. In the illustrated example, the predictor 245 determines the sensing link latency, $\tau_s$, based on the difference between the receive timestamp added by the control-side receiver 250 and the transmit timestamp 270 included in the sensor message 266 conveying received measurement being processed.

In the illustrated example, the future state 320 output from the predictor 245, which is represented by (t) in FIG. 3, is fed to the controller 235, which calculates the control signal, represented by u(t) in FIG. 3. Because the controller 235 calculates the control signal u(t) based on the future state 320, which is predicted for a time $\tau_s+\tau_{a,MAX}$ in the future relative to the estimated state 315 output from the observer 240, which is delayed in time by the sensing link latency $\tau_s$, the control signal is also advanced in time by $\tau_s+\tau_{a,MAX}$ relative to the delay $\tau_s$ associated with the estimated state 315 output from the observer 240. The client-side transmitter 252 samples (digitizes) the control signal, encapsulates the sampled control signal 325 in the data payloads 274 of the actuation messages 272 along with the transmit timestamps 276, and transmits the actuation messages 272 via the WAL 264 to the target-side receiver 254. The delivery of the actuation messages 272 over the WAL 264 exhibit a random delay $\tau_a$ (which may be caused by one or more factors, such as packet-errors over the wireless channel, non-deterministic access to the wireless channel, etc.), but which guaranteed by the WTSN 260 to be below a maximum value (upper bound), at least with a specified reliability. Because the control signal u(t) is calculated for a time $\tau_s+\tau_{a,MAX}$ in the future relative to the delayed estimated state 315, which was delayed in time by the sensing link latency $\tau_s$, and the actuation messages 272 exhibit a random delay $\tau_a$, the resulting control signal values received at the actuator 220 will be received close to, or slightly ahead of, when they need to be acted on by the actuator. For example, the control signal values will be received ahead of time by an offset of $\tau_{a,MAX}-\tau_s$ relative to when those control signal values are to be acted on by the actuator 220.

Once the sampled control signal 325 conveyed by the actuation messages 272 are received by the actuator 220, they are acted on by the actuator 220 based on their timestamps 276. In some examples, by knowing when the control signals were sent and received it is possible to know when they must be applied because the delay to be compensated by the predictor 245 is known by design. For example, the actuator 220 can determine the random actuation link delay $\tau_a$ based on the different of the received and transmit timestamps associated with the actuation messages 272, and then determine the timing offset at which the sampled control signal 325 is to be acted on as $\tau_{a,MAX}-\tau_a$. However, in some examples, instead of, or in addition to, time-stamping the actuation messages 272 with the sending time, the actuation messages 272 may be time-stamped with the time for which the control signal is intended to be applied. In the illustrated example of FIG. 3, the actuator 220 transforms (e.g. with a zero order hold (ZOH) operation) the sampled control signal 325 to form a continuous time actuation signal 330, which is fed to the target system 215, thereby closing the predictive wireless feedback control loop.

Figure 4:
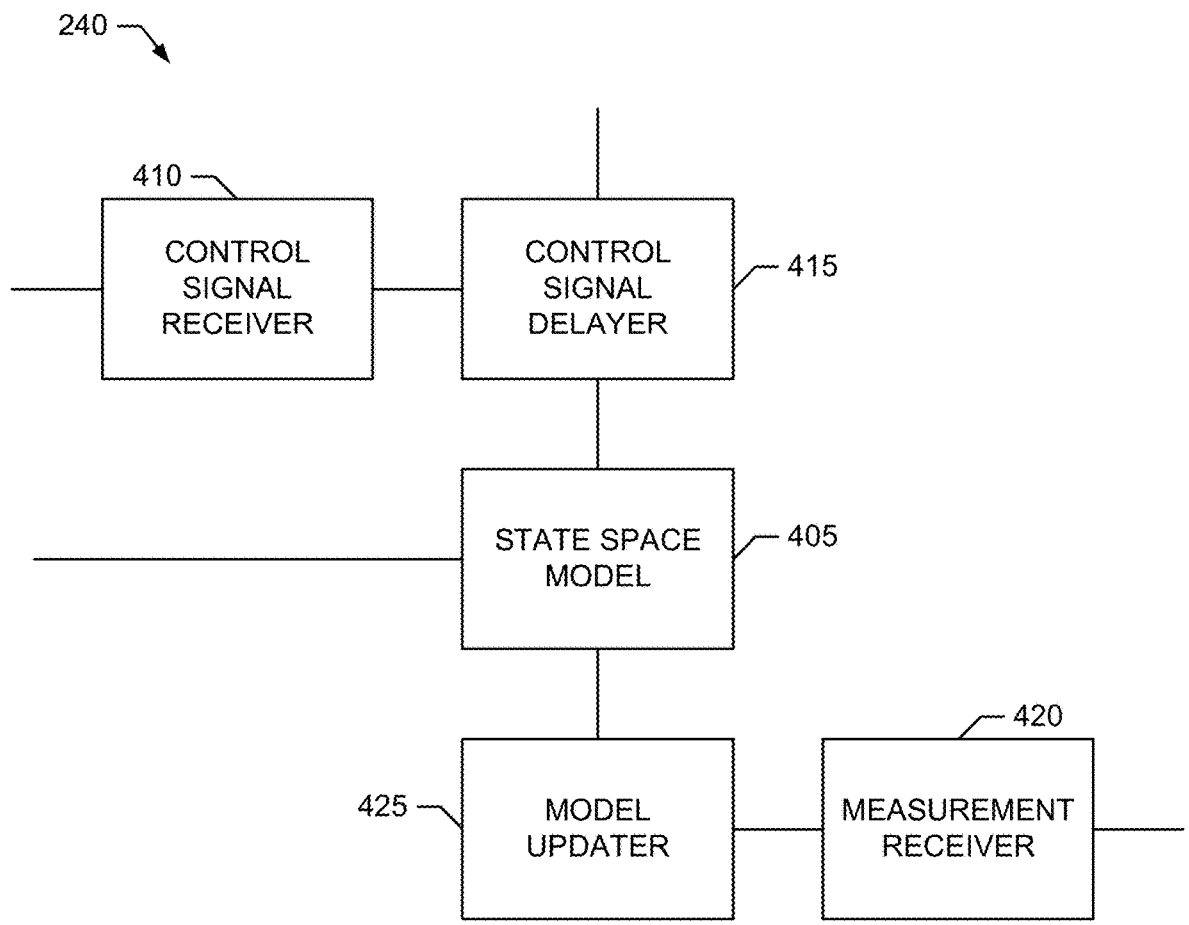
FIG. 4 is a block diagram of an example observer that may be used to implement the example predictive wireless feedback control system of FIG. 2.

An example implementation of the observer 240 of FIG. 2 is illustrated in FIG. 4. The example observer 240 of FIG. 4 is an example of means for outputting estimated values of states of the controlled system 215 based on a state space model of the controlled system 215 that is updated based on measurements of the controlled system 215. However, other examples of means for outputting estimated values of states of the controlled system 215 are disclosed in further detail below. The example observer 240 of FIG. 4 includes an example state space model evaluator 405, an example control signal receiver 410, an example control signal delayer 415, and example measurement receiver 420 and an example model updater 425. The state space model evaluator 405 of the illustrated example outputs estimated values of states of the controlled system 215 that are determined by evaluating a state space model of the controlled system 215. In the illustrated examples, the state space model is a mathematical model that represents the dynamics of the observable state of the controlled system 215. For example, the state space model employed by the state space model evaluator 405 may include mathematical equations that represent how the observable states of the controlled system 215 are expected to respond to actuator adjustments that are applied to the controlled system 215 in response to the control signal values generated by the controller 235. The mathematical equations may be specified based on scientific principles governing the operation of the controlled system 215, empirical results obtained over time, etc.

An example state space model employed by the state space model evaluator 405 is represented by Equation 1:

$$\dot{x}_1(t)=x_2(t)$$

$$\dot{x}_2(t)=f(u(t)). \quad\quad\quad \text{Equation 1}$$

The example state space model of Equation 1 represents a controlled system 215 that has two observable states, $x_1(t)$ and $x_2(t)$, with characteristics such that the rate of change of the first state $x_1(t)$ equals the value of the second state $x_2(t)$. The example state space model of Equation 1 further specifies that the rate of change of the second state $x_2(t)$ is a function $f$ of the control signal u(t) determined by the controller 235, where the function $f$ can be a linear function, a nonlinear function, etc. For example, the states, $x_1(t)$ and $x_2(t)$, may represent two observable positions of the controlled system 215 along two different axes, and the state space model of Equation 1 further specifies that the rate of change of the first position along the first axis is directly related to (e.g., equals) the first position, and the rate of change of the second position along the second axis is directly related to (e.g., equals) function of the control signal u(t) determined by the controller 235.

In the illustrated example of FIG. 4, the state space model employed by the state space model evaluator 405 is updated based on the measurement of the controlled system 215 obtained by the sensor(s) 225 and transmitted by the target-side transmitter 256 to the control-side receiver 250, which is in communication with the state space model evaluator 405. In some examples, the controller 215 operates to generate control signal values at a rate that is higher than the rate at which the measurements of the controlled system 215 are obtained by the sensor(s) 225 and received by the control-side receiver 250. Accordingly, the state space model evaluator 405 can evaluate the state space model using the control signal values generated by the controller 234 for instants of time between the received measurement to effectively interpolate the estimated state of the controlled system 215 between the available measurements.

Furthermore, as explained above, the measurements of the controlled system 215 that are received by the control-side receiver 250 are delayed based on the sensing link latency $\tau_s$ associated with the WSL 262. Because the state space model employed by the state space model evaluator 405 is updated based on measurements that are delayed by the sensing link latency $\tau_s$, the estimates of the observable state output by the state space model are likewise delayed in time by the sensing link latency $\tau_s$. Accordingly, to ensure that the values of the control signal input to the state space model coincide with the delay associated with the available measurements used to update the model, a corresponding delay is applied to the control signal values used to evaluate the state space model. Hence, the example observer 240 of the FIG. 4 includes the control signal receiver 410 to receive the control signal generated by the controller 235, and includes the control signal delayer 415 to delay the control signal values by an appropriate amount of time to account for the sensing link latency $\tau_s$. However, as explained above, the control signal u(t) is determined for a time $\tau_s + \tau_{a,MAX}$ in the future relative to the delayed estimated state 315, which was delayed in time by the sensing link latency $\tau_s$. Thus, the control signal delayer 415 also delays the control signal values by $\tau_{a,MAX}$, which is the maximum expected latency for the WAL 264.

In the illustrated example, the control signal delayer 415 delays the values of the control signal received by the control signal receiver 410 by a sum of the sensing link latency $\tau_s$ for the WSL 262 and the maximum expected actuation link latency $\tau_{a,MAX}$ for the WAL 264, that is, $\tau_s + \tau_{a,MAX}$. In some examples, the control signal delayer 415 determines the sensing link latency $\tau_s$ based on (e.g., taking the difference between) the receive timestamp determined by the receive timestamper 284 for a given received sensor message 266 and the transmit timestamp 270 included in the given sensor message 266. For example, the received sensor message 266 used by the control signal delayer 415 to determine the sensing link latency $\tau_s$ may be the most recently received sensor message 266 whose measurement value has been used to update the state space model. In some examples, the control signal delayer 415 determines the sensing link latency $\tau_s$ based on a running average of differences between received timestamps and transmit timestamps for a group of received sensor messages 266, possibly with weighting to weight recent sensor messages 266 more heavily than older sensor messages 266. In some examples, the control signal delayer 415 determines the maximum expected actuation link latency $\tau_{a,MAX}$ from a configuration parameter specifying this latency value according to known characteristics of the WSTN 260 implementing the WAL 264.

The example observer 240 of FIG. 4 includes the measurement receiver 420 to receive the measurement values contained in sensor messages 260, which were received by the control-side receiver 250. The example observer 240 of FIG. 4 includes the model updater 425 to update the state space model of the controlled system 215 based on the measurement values received by the measurement receiver 420. In the illustrated example, the model updater 425 is to determine whether unprocessed measurements are available at a time when the state space model is to be updated. For example, the model updater 425 may check whether a new sensor message 266 containing an unprocessed measurement has been received by the control-side receiver 250 and, if so, determine that it is time to update the state space model. If unprocessed measurements are available, the model updater 425 is to update the state space model based on error values. In some examples, the model updater 425 is to determine the error values based on differences between observed values of the controlled system 215 represented by the received measurements and the corresponding estimated values of the states of the controlled system 215, which are output by the state space model evaluator 405.

For example, the model updater 425 may update the state space model employed by the state space model evaluator 405 as follows. If a new sensor message 266 is received (e.g., which contains an unprocessed measurement of the controlled system 215), the model updater 425 determines an error value given by Equation 2 and updates the model according to Equation 3, which are given by:

$$e_0(t) = \begin{bmatrix} x_1(k) \\ x_2(k) \end{bmatrix} - \begin{bmatrix} \hat{x}_1(t) \\ \hat{x}_2(t) \end{bmatrix} \quad \text{Equation 2}$$

$$\dot{\hat{x}}_1(t) = \hat{x}_2(t) + f_1(e_0(t)) \quad \text{Equation 3}$$

$$\dot{\hat{x}}_2(t) = f(u(t)) + f_2(e_0(t))$$

Otherwise, if a new sensor message 266 has not been received, then the model updater 425 does not update the model based on any measurements but, rather, evolves the model based on the next available value of the control signal u(t) according to Equation 4, which is given by:

$$\dot{\hat{x}}_1(t) = \hat{x}_2(t)$$

$$\dot{\hat{x}}_2(t) = f(u(t)). \quad \text{Equation 4}$$

In Equations 2, $x_1[k]$ and $x_2[k]$ represent the measurements of the states of the controlled system 215 contained in the received sensor message 266, $\hat{x}_1(t)$ and $\hat{x}_2(t)$ represent the estimated state values output by the state space model evaluator 405, and $e_0(t)$ represents the state space model error. Equation 3 represents how the state space model of Equation 1 is updated based on the state space model error $e_0(t)$ determined from the received measurement and the next available value of the control signal u(t). Equation 4 represents how the state space model of Equation 1 is evolved based on just the next available value of the control signal u(t) when a new, unprocessed measurement is not available.

Figure 5:
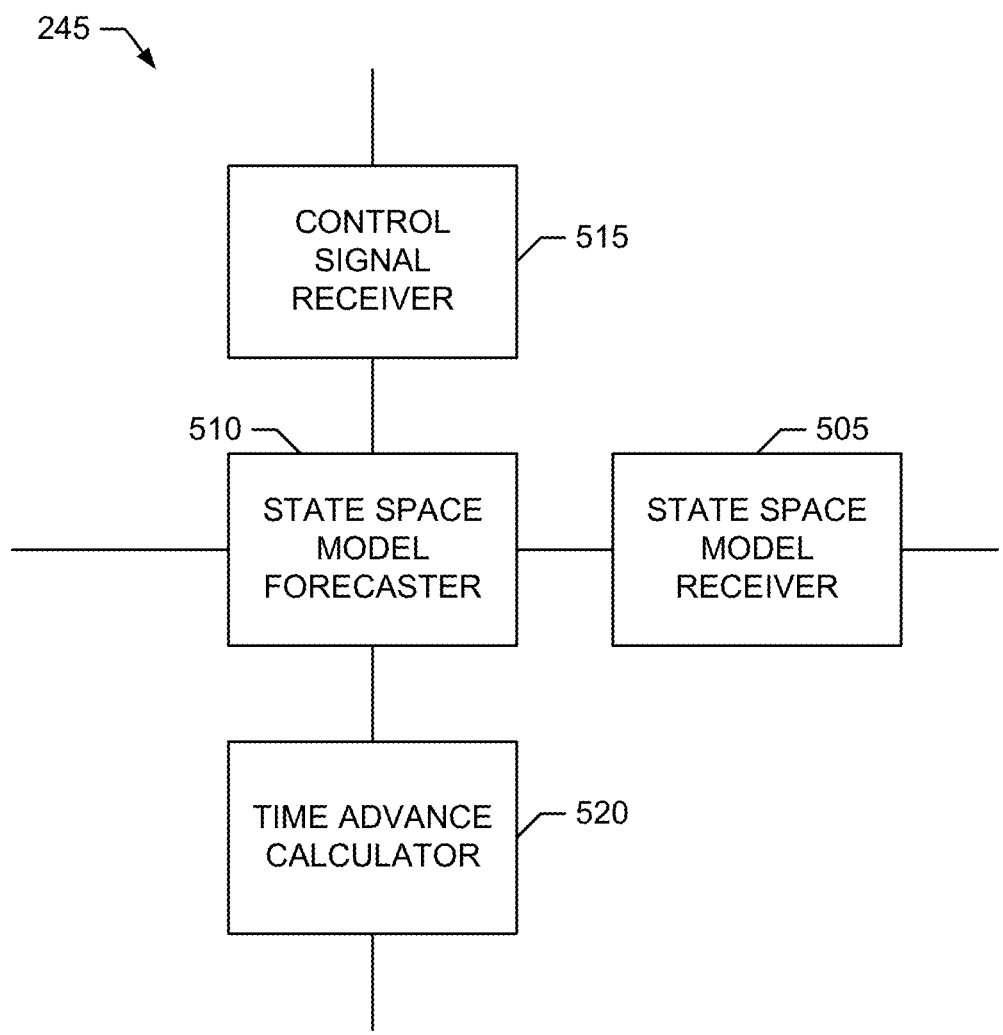
FIG. 5 is a block diagram of an example predictor that may be used to implement the example predictive wireless feedback control system of FIG. 2.

An example implementation of the predictor 245 of FIG. 2 is illustrated in FIG. 5. The example predictor 245 of FIG. 5 is an example of means for predicting future values of the states of the controlled system 215 based on estimated values of the states of the controlled system 215 and latencies associated with the WSL 262 and the WAL 264. However, other examples of means for predicting such future values of the states of the controlled system 215 are disclosed in further detail below. The example predictor 245 of FIG. 5 includes an example state space model receiver 505, an example state space model forecaster 510, an example control signal receiver 515 and an example time advance calculator 520. The state space model forecaster 510 is to predict future values of the states of the controlled system 215 based on the estimated values of the states of the controlled system 215 output by the state space model evaluator 405, the sensing link latency $\tau_s$ associated with the WSL 262, and the upper limit of the expected actuation link latency $\tau_{a,MAX}$ associated with the WAL 264. In the illustrated example of FIG. 5, the state space model forecaster 510 predicts the future values of the states of the controlled system 215 using the state space model employed by the state space model evaluator 405. Accordingly, the state space model receiver 505 is included in the predictor 245 to obtain the latest version of the state space model as updated/evolved by the state space model evaluator 405. The state space model forecaster 510 is to predict the future values of the states of the controlled system 215 based on the estimated values of the states of the controlled system 215 currently output by the state space model evaluator 405, and future output values of the state space model determined based on values of the control signal u(t) determined by the controller 235 for application to the actuator 220 during a window of time after the time associated with the estimated values of the states of the controlled system 215 output by the state space model evaluator 405. In some examples, the window of time starts at a first time associated with the estimated values of the states of the controlled system 215 currently output by the state space model evaluator 405, and has a duration corresponding to a sum of the sensing link latency $\tau_s$. associated with the WSL 262, and the upper limit of the expected actuation link latency $\tau_{a,MAX}$ associated with the WAL 264.

For example, based on the state space model of Equation 1, the state space model forecaster 510 may predict the future values of the states (t) of the controlled system 215 according to Equation 5, which is given by:

$$\xi(t) = \begin{bmatrix} \hat{x}_1(t) \\ \hat{x}_2(t) \end{bmatrix} + \int_{t-(\tau_{a,Max}+\tau_s)}^{t} \begin{bmatrix} \xi_2(\theta) \\ f(u(\theta)) \end{bmatrix} d\theta,$$ Equation 5

$$\xi(t) = \begin{bmatrix} \xi_1(t) \\ \xi_2(t) \end{bmatrix}$$

In Equation 5, $$\xi(t) = \begin{bmatrix} \xi_1(t) \\ \xi_2(t) \end{bmatrix}$$

represents the predicted future states of the controlled system 215 at a time t that is $(\tau_{a,MAX}+\tau_s)$ ahead in time relative to the estimated values of the states of the controlled system 215 currently output by the state space model evaluator 405, which is represented by $$\begin{bmatrix} \hat{x}_1(t) \\ \hat{x}_2(t) \end{bmatrix};$$

notice that $\hat{x}_1 \approx x_1(t-\tau_s)$, $\hat{x}_2 \approx x_2(t-\tau_s)$. The term $$\int_{t-(\tau_{a,MAX}+\tau_s)}^{t} \begin{bmatrix} \xi_2(\theta) \\ f(u(\theta)) \end{bmatrix} d\theta$$

represents evaluation of the state space model based on values of the control signal u(t) determined by the controller 235 for application to the actuator 220 during a window of time having a duration of $(\tau_{a,MAX}+\tau_s)$ beginning after the time associated with the estimated values of the states of the controlled system 215 currently output by the state space model evaluator 405.

The state space model forecaster 510 of the illustrated example outputs the predicted states ξ(t) of the controlled system 215 to the controller 235. The controller 215 generates an error signal e(t) based on the predicted states ξ(t) the controlled system 215 and a reference signal representative of a desired state x(t) of the controlled system 215. In some examples, the controller 235 computes the error signal e(t) as a difference between the desired state x(t) of the controlled system 215 and a function of the predicted states ξ(t) the controlled system 215 according to Equation 6, which is given by:

$$e(t)=g(\xi_1(t))-x_{ref}(t),$$ Equation 6 where g(•) represents the function of the predicted states (t). For example, the function g(•) may output a first one of the predicted states ξ(t) such that the error signal e(t) processed by the controller 235 to determine its output control signal is given by Equation 7, which is:

$$e(t)=\xi_1(t)-x_{ref}(t)$$ Equation 7

The example predictor 245 of FIG. 5 includes the time advance calculator 520 to calculate the window of time for which the state space model forecaster 510 is to predict the future values of the states (t) of the controlled system 215. As described above, the window of time is $(\tau_s+\tau_{a,MAX})$ ahead in time relative to the estimated values of the states of the controlled system 215 currently output by the state space model evaluator 405. In other words, the window of time is a sum of the sensing link latency $\tau_s$ for the WSL 262 and the maximum expected actuation link latency $\tau_{a,MAX}$ for the WAL 264, that is, $\tau_s+\tau_{a,MAX}$. In some examples, the time advance calculator 520 determines the sensing link latency $\tau_s$ based on (e.g., taking the difference between) the receive timestamp determined by the receive timestamper 284 for a given received sensor message 266 and the transmit timestamp 270 included in the given sensor message 266. For example, the received sensor message 266 used by the time advance calculator 520 to determine the sensing link latency $\tau_s$ may be the most recently received sensor message 266 whose measurement value has been used to update the state space model. In some example, the time advance calculator 520 determines the sensing link latency $\tau_s$ based on a running average of differences between received timestamps and transmit timestamps for a group of received sensor messages 266, possibly with weighting to weight recent sensor messages 266 more heavily than older sensor messages 266. In some examples, the time advance calculator 520 determines the maximum expected actuation link latency $\tau_{a,MAX}$ from a configuration parameter specifying this latency value according to known characteristics of the WSTN 260 implementing the WAL 264.

FIGS. 6A-8B illustrate example operational results obtained by an example implementation of the observer 240 and the predictor 245 in the example predictive wireless feedback control system 200. In the illustrated example of FIGS. 6A-8B, the controlled system 215 corresponds to an example ball balancing table provided by Acrome. The ball balancing table includes a table that is supported on two orthogonal sides by legs attached to two servomotors such that a position of a ball placed on the table can be adjusted by varying the heights of the two legs, thereby causing the ball to roll on the table in a controlled manner. In this example, the two servomotors correspond to the actuator 220, the ball balancing table includes position sensors that correspond to the sensors 225, and the ball balancing table includes a controller computer to implement the controller 215. Thus, the ball balancing table is a relevant example of a controlled system 215 because it exhibits mechanical dynamics (which is present in many industrial plants), electrical dynamics (due to the servomotors) and it supports a WTSN, such as the WTSN 260.

The state space model that describes the dynamics of the mechanical part of ball balancing table example is given by Equation 8, which is $$\ddot{x} = \frac{m_b g r_b^2 r_M}{(m_b r_b^2 + j_b)L_x}\sin(\vartheta_x) \qquad \text{Equation 8}$$

$$\ddot{y} = \frac{m_b g r_b^2 r_M}{(m_b r_b^2 + j_b)L_y}\sin(\vartheta_y).$$

In Equation 8, x, y are the ball position in the x and y axes, $m_b$, $r_b$, $j_b$, $r_M$, $L_x$, $L_y$ are the mass of the ball, its radius, its inertia moment, the length of the arm between the motor and the plate, and the dimensions of the table in the x and y axes respectively, and $\vartheta_x$, $\vartheta_y$ are the angles of the motors, which are used as control variables. The transfer function for the servomotors is given by Equation 9, which is:

$$G_M(s) = \frac{100}{0.01s + 1} \qquad \text{Equation 9}$$

In the example operational results of FIGS. 6A-8B, the sensing link latency was variable from 10 milliseconds (ms) to 15 ms maximum with a reliability of 99.99968%, and the actuation link latency was fixed at 15 ms. The sampling rate employed in the system was also 15 ms. FIG. 6A-B represents the operational results of controlling the ball balancing table such that the ball tracks a first reference signal having a frequency of ω=0.5 π radians/sec. FIG. 7A-B represents the operational results of controlling the ball balancing table such that the ball tracks a second reference signal having a frequency of ω=4 π radians/sec, which is faster than the first reference signal. In the examples of both FIG. 6A-B and FIG. 7A-B, during the first 50 seconds of operation the predictor 245 is turned off, and after that time the predictor 245 is turned on. In FIGS. 6A-B, lines 605 represents the reference to be tracked, and lines 610 represents the measurement from the plant 215. In FIGS. 7A-B, lines 705 represents the reference to be tracked, and lines 710 represents the measurement from the plant 215.

In FIG. 6A, the plant 215 tracks a reference signal 605 with a frequency of ω=0.5 π rad/sec. During the first 50 seconds, the tracking signal 610 presents ripples along the reference because the predictor 245 is disabled. This ripple effect in the tracking signal 610 is attenuated when the predictor 245 is enabled for the time period from 50 seconds to 100 seconds. Thus, the smoothness of the tracking signal 610 improves when the predictor 245 is enabled. FIG. 6B is a zoomed-in version of the graph, which further illustrates how the predictor 245 improves performance of the tracking signal 610 once the predictor is enabled at the 50 second mark.

FIG. 7A illustrates the effect of control system communication latency when the plant 215 has faster dynamics. In the illustrated example, when tracking a reference signal 705 with a frequency of ω=4 π radians/sec, the tracking signal 710 deviates from the reference signal 705 during the first 50 seconds because the predictor 245 is disabled. However, when the predictor 245 is enabled at the 50 second mark, the performance of the tracking signal 710 improves substantially. FIG. 7B is a zoomed-in version of the graph, which further illustrates how the predictor 245 improves performance of the tracking signal 710 once the predictor is enabled at the 50 second mark.

Returning to FIG. 2, the schedulers 290 and 292 are included in the client-side transmitter 252 and the target-side transmitter 256, respectively, and the monitors 294 and 296 are included in the control-side receiver 250 and the target-side receiver 254, respectively, to adapt the reliability requirements of the messages communicated via WSTN 260 to, for example, increase the number of feedback control systems and/or other users that can be served by the WSTN 260. Such link adaptation enables specification of a target reliability for the predictive wireless feedback control system 200, and is achieved by the target-side monitor 296 reporting feedback on transmission errors to the control-side scheduler 290 and/or the client-side monitor 294 reporting feedback on transmission errors to the target-side scheduler 292. Given a target reliability level, the transmission error feedback can indicate whether the system 200 is overinformed, that is, if the system 200 is obtaining information more often than is needed to satisfy the target reliability level. If the dynamics of the controlled system 215 and/or the expected performance of the predictive wireless feedback control system 200 do not requires a high rate of samples per time unit, the target reliability level can be decreased, thereby freeing communication resources for other control systems 200 and/or uses in the WSTN 260.

In the illustrated example, the schedulers 290 and/or 292 implement an adaptive scheduling algorithm that varies the number of communication retries to be performed to help ensure a transmitted message (e.g., a sensor message 266, an actuation message 272, etc.) is received correctly at its intended destination. In some examples, the schedulers 290 and/or 292 vary the number of communication retries based on transmission errors reported by the respective monitors 296 and/or 294. Accordingly, the scheduler 290 is an example of means for adjusting a number of retries to be performed to transmit messages via the WAL 264, and the scheduler 292 is an example of means for adjusting a number of retries to be performed to transmit messages via the WSL 262. However, other example of means for adjusting the number of retries to be performed to transmit messages via the WAL 262 and./or the WSL 262 are disclosed in further detail below. In some examples, the schedulers 290 and/or 292 may set the number of retries based on (e.g., proportional to, equal to, etc.) a reliability value γ determined according to Equation 10, which is $$\dot{\gamma} = k \ast \text{sign}(c \ast e - \mu) \qquad \text{Equation 10}$$

Equation 10 specifies that the reliability, γ, is adjusted based on the reported transmission errors e and a target error bound μ. In Equation 10, the sign( ) function outputs the sign of the input argument (c*e−μ), and the parameters k and c are design gains that adjust the adaptation velocity and the importance of the errors respectively. Thus, based on Equation 10, if the scaled number of transmission errors (c*e) exceeds the target error bound then the reliability is increased with a slop of k, which causes a corresponding increase in the number of communication retries configured by the scheduler 290 and/or 292 for its respective transmitter 252 and/or 256. Conversely, if the scaled number of transmission errors (c*e) does not exceed the target error bound μ, then the reliability is decreased with a slop of −k, which causes a corresponding decrease in the number of communication retries configured by the scheduler 290 and/or 292 for its respective transmitter 252 and/or 256. Accordingly, Equation 10 implements a sliding mode that adjusts the reliability y to a value to keep the difference between the error e and the bound μ close to zero. Depending on the target error allowed, the controller 215 might not always require complete reliability (e.g., it could lose some samples) and still maintain a required level performance.

Figure 8:
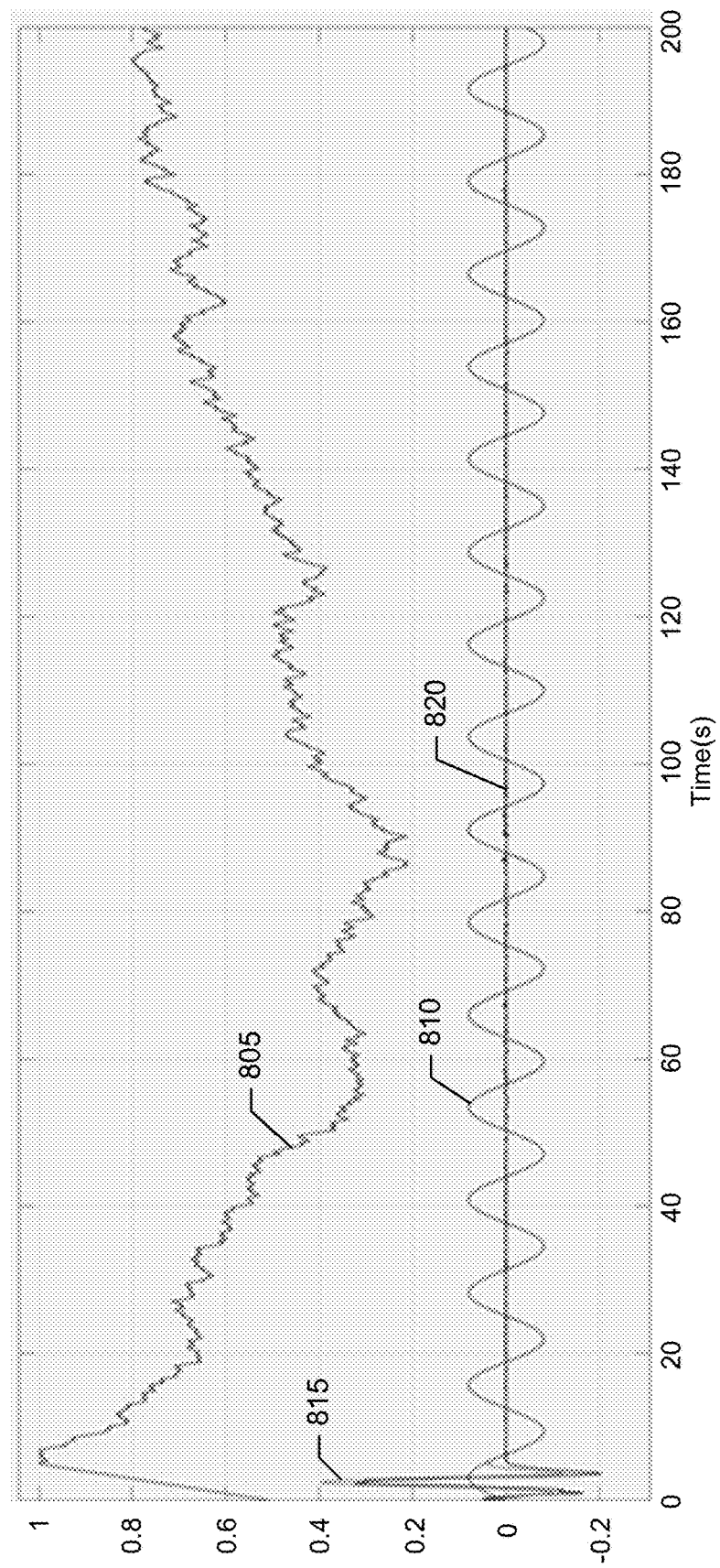
FIG. 8 illustrates example operational results for an example transmission scheduler implementation in the example predictive wireless feedback control system of FIG. 2.

FIG. 8 illustrates example operational results obtained by an example implementation of the control-side scheduler 290 and the plant and the target-side monitor 296 based on Equation 10. In the illustrated example of FIG. 8, target error bound µ changed at t=100 such that the allowed maximum error was reduced by a factory of ⅙. In FIG. 8, the line labeled 805 represents the reliability requested of the control-side transmitter 252 by the controller 235 (which varies from 100% to 20%), the line labeled 810 is the reference signal to be tracked by the plant, the line labeled 815 is the observed state of the plant (which coincides with the reference signal except at the start of the graph), and the line labeled 820 is the tracking error. As shown in FIG. 8, at the beginning of operation, the reliability specified according to Equation 10 is about 100% because the error substantially exceeds the allowed error bound due to the transient response. However, once the transient response passes, the reliability settles around 30%. Then, at t=100 s the allowed error bound is decreased, thereby causing the reliability specified according to Equation 10 to increase to meet the decreased allowed error, with the reliability specified according to Equation 10 settling to values in the range of 70%-80%.

As mentioned above, in some examples, the controller 235 of FIG. 2 is implemented by a conventional controller. For example, the controller 235 may implement a conventional linear PID controller, which is a popular type of industrial controller because it may require little to no knowledge of the plant dynamics, it has proven tuning procedures, etc. However, in some examples, the controller 235 implements an example nonlinear PID controller in accordance with teachings of this disclosure. For example, the controller 235 may implement such as nonlinear PID controller based on the Equation 11, which is given by:

$$u = -k_p \lfloor e \rceil^{\alpha_1} - k_d \lfloor \dot{e} \rceil^{\alpha_2} + v$$

$$\dot{v} = k_i \lfloor e \rceil^{\alpha_3},  \quad \text{Equation 11}$$

Equation 11 generates an output control signal u based on an input error e. In Equation 11, the coefficients $k_p$, $k_d$ and $k_i$ represent a proportional coefficient, a derivative coefficient and an integral coefficient, respectively. In Equation 11, the function $\lfloor e \rceil$ is defined by Equation 12, which is:

$$\lfloor e \rceil^\alpha = |e|^\alpha \text{sign}(e) \quad \text{Equation 12}$$

In Equation 11, the constants $\alpha_1$, $\alpha_2$, $\alpha_3$ are defined by Equation 13, which is $$\alpha_1 = \frac{1}{1-2m}$$
$$\alpha_2 = \frac{1}{1-m} \quad \text{Equation 13}$$
$$\alpha_3 = \frac{1+m}{1-2m}$$

In Equation 13, m is a configuration parameter that can range from 0 to 1, that is m∈[0,1]. When m=0. the controller 235 implements a linear PID controller (e.g., a smooth controller), whereas when m=1, the controller 235 is nonlinear (e.g., and may have a more aggressive, robust response than a linear PID controller).

Thus, in examples in which the controller 235 implements an example nonlinear PID controller in accordance with teachings of this disclosure, the controller 235 is an example of means for implementing a proportional, derivative and integral control algorithm based on corresponding proportional, derivative and integral control coefficients, which are determined based on a function that is to raise a magnitude of an error (e) by an exponent (e.g., $\alpha_1$, $\alpha_2$, $\alpha_3$). However, other examples of means for such a nonlinear PID control algorithm are disclosed in further detail below. In examples in which the controller 235 is included in the predictive wireless feedback control system 200, the error may be determined as a difference between the desired reference state x(t) of the controlled system 215 and a function of the predicted states $\xi$(t) the controlled system 215 output by the predictor 245, as given by Equation 6. In examples in which the controller 235 is not included in the predictive wireless feedback control system 200 (and, thus, may be used to replace the controller of a conventional feedback control system), the error may be determined as a difference between the desired reference state x(t) of the controlled system 215 and the measured state of the controlled system.

Figure 9A:
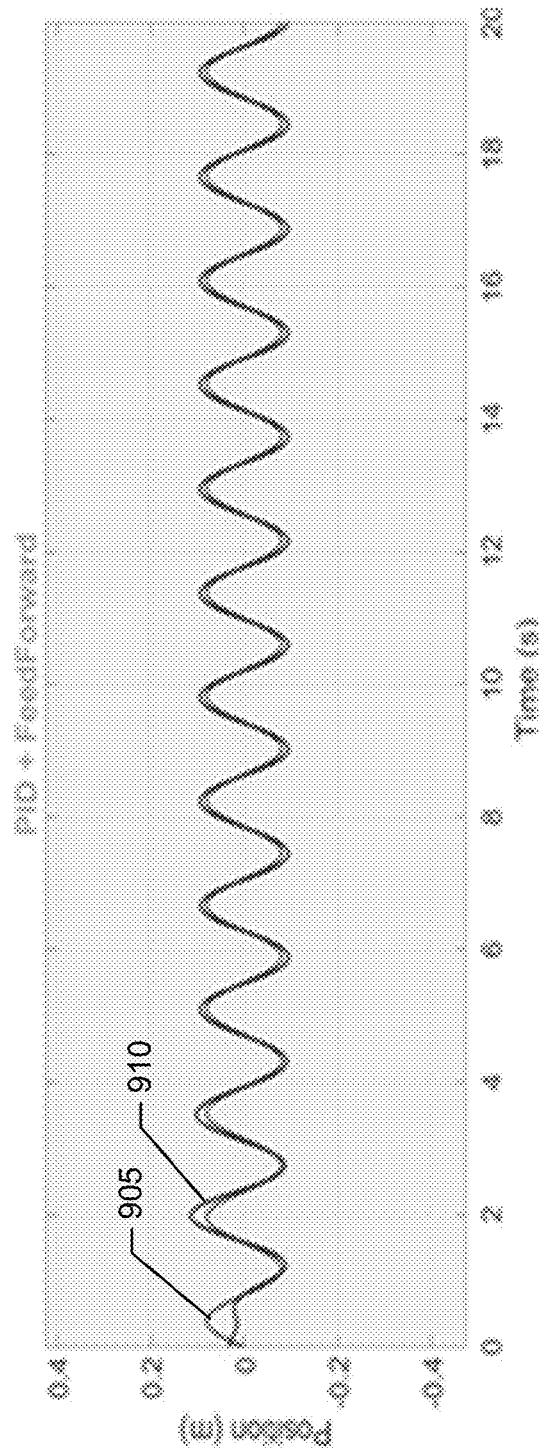
FIGS. 9A-10B illustrate example operational results obtained by an example nonlinear proportional, integral and derivative (PID) control algorithm implemented in the example predictive wireless feedback control system of FIG. 2.
Figure 9B:
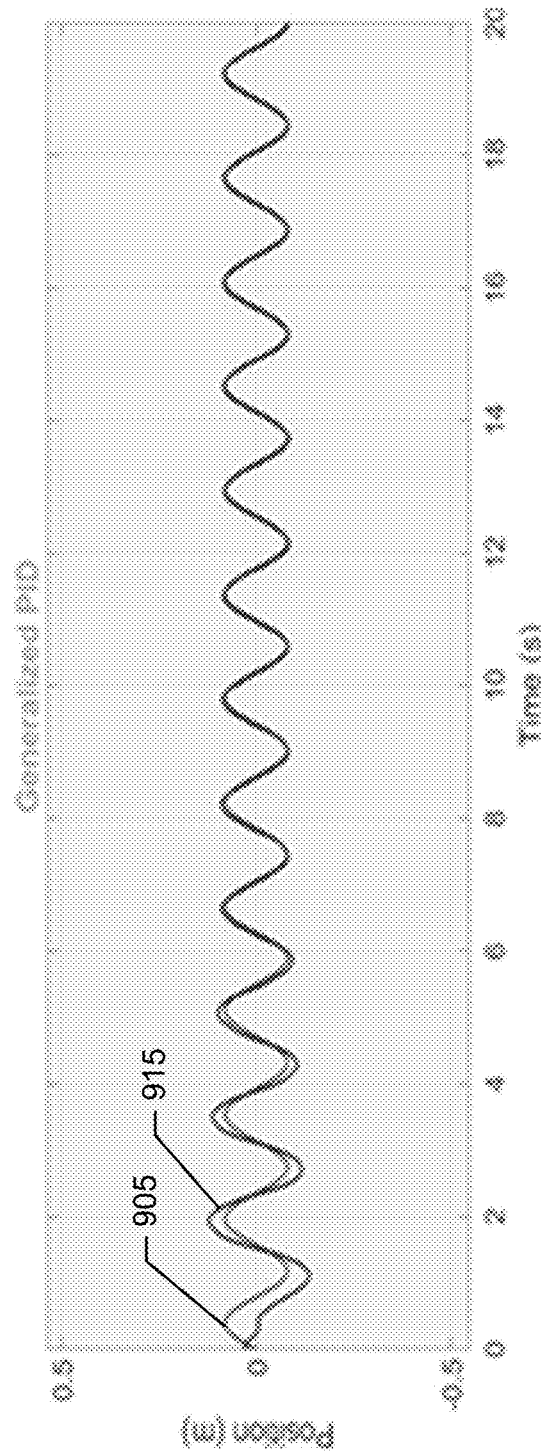

FIGS. 9A-B illustrate example operational results obtained by the controller 235 when implementing an example nonlinear PID controller in accordance with teachings of this disclosure. The example results of FIGS. 9A-B compare performance of a disclosed example nonlinear PID controller 235 with performance of a conventional linear PID controller with feedforward. The linear PID controller with feedforward is conventional technique used to enable the linear PID to track time-varying signals, but it requires knowledge of the reference to be tracked and first, second and third derivatives of that reference (which may difficult or not feasible to obtain). In FIGS. 9A-B, the line labeled 905 represents the reference to be tracked (which has a frequency of 4π rad/sec in this example). In FIG. 9A, the line labeled 910 is the tracking achieved by the conventional linear PID controller with feedforward. In FIG. 9B, the line labeled 915 is the tracking achieved by the disclosed example nonlinear PID controller. As can be seen, the nonlinear PID controller results in a tracking signal that stays closer to the reference.

Figure 10A:
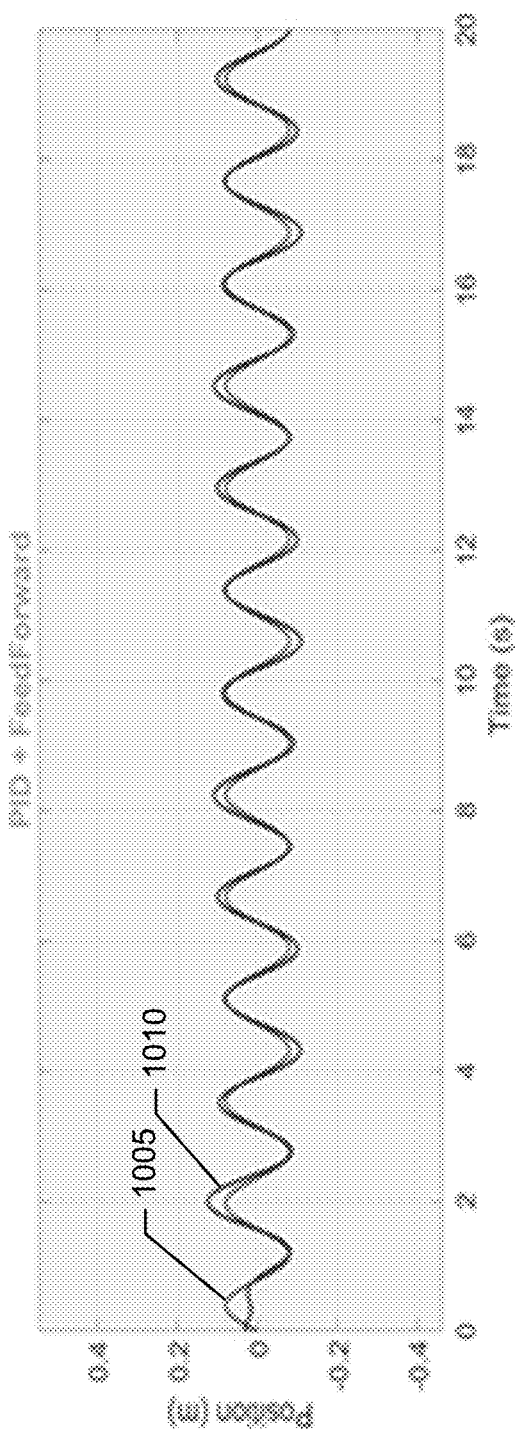
Figure 10B:
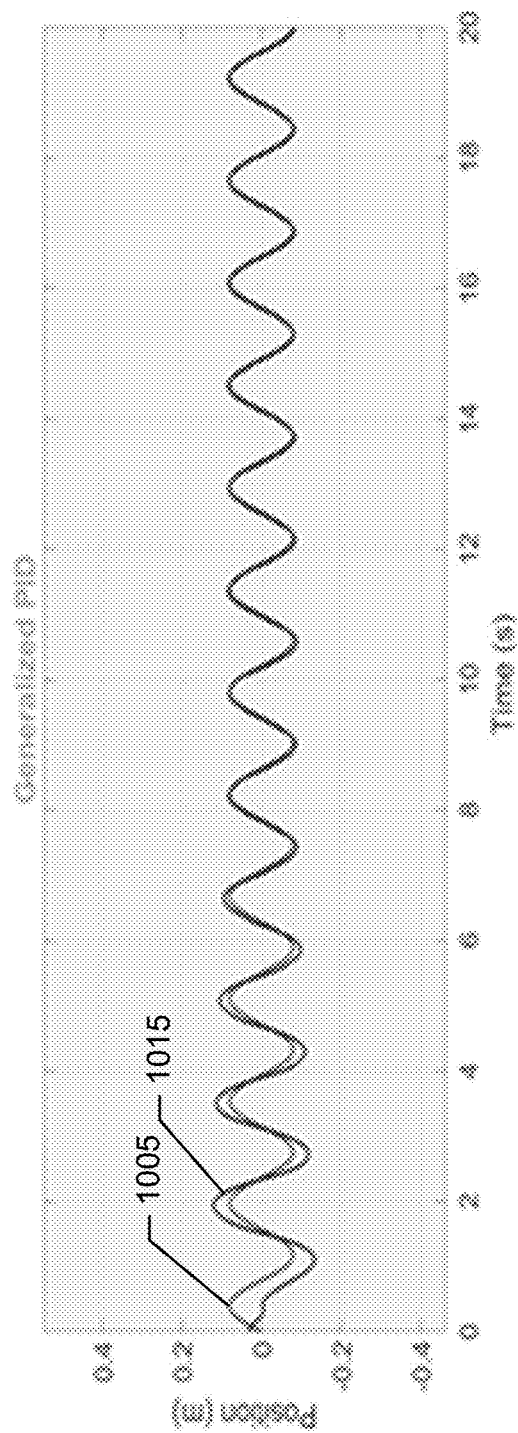

To show the robustness against disturbances, FIGS. 10A-B compare performance of a disclosed example nonlinear PID controller 235 with performance of a conventional linear PID controller with feedforward when both controllers are operating in a system under an external disturbance d=$f$(t,x) dependent on time and the state. In FIGS. 10A-B, the line labeled 1005 represents the reference to be tracked (which has a frequency of 4π rad/sec in this example). In FIG. 10A, the line labeled 1010 is the tracking achieved by the conventional linear PID controller with feedforward. In FIG. 10B, the line labeled 915 is the tracking achieved by the disclosed example nonlinear PID controller. The example results of FIGS. 10A-B, demonstrate that the effects of the disturbance can be substantial in the system controlled by the conventional linear PID plus feedforward controller, whereas the disclosed example nonlinear PID controller exhibits robustness against this disturbance.

While example manners of implementing the predictive wireless feedback control system 200 are illustrated in FIGS. 2-5, one or more of the elements, processes and/or devices illustrated in FIG. 2-5 may be combined, divided, re-arranged, omitted, eliminated and/or implemented in any other way. Further, the example actuator 220, the example sensors 225, the example predictive feedback control solution 230, the example controller 235, the example observer 240, the example predictor 245, the example control-side receiver 250, the example control-side transmitter 252, the example target-side receiver 254, the example target-side transmitter 256, the example MAC synchronizers 278, 279, 280 and/or 281, the example transmit timestamper 282, the example receive timestamper 284, the example transmit timestamper 286, the example receive timestamper 288, the example schedulers 290 and/or 292, the example monitors 294 and/or 296, and/or, more generally, the example predictive wireless feedback control system 200 of FIGS. 2-5 may be implemented by hardware, software, firmware and/or any combination of hardware, software and/or firmware. Thus, for example, any of the example actuator 220, the example sensors 225, the example predictive feedback control solution 230, the example controller 235, the example observer 240, the example predictor 245, the example control-side receiver 250, the example control-side transmitter 252, the example target-side receiver 254, the example target-side transmitter 256, the example MAC synchronizers 278, 279, 280 and/or 281, the example transmit timestamper 282, the example receive timestamper 284, the example transmit timestamper 286, the example receive timestamper 288, the example schedulers 290 and/or 292, the example monitors 294 and/or 296, and/or, more generally, the example predictive wireless feedback control system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example predictive wireless feedback control system 200, the example actuator 220, the example sensors 225, the example predictive feedback control solution 230, the example controller 235, the example observer 240, the example predictor 245, the example control-side receiver 250, the example control-side transmitter 252, the example target-side receiver 254, the example target-side transmitter 256, the example MAC synchronizers 278, 279, 280 and/or 281, the example transmit timestamper 282, the example receive timestamper 284, the example transmit timestamper 286, the example receive timestamper 288, the example schedulers 290 and/or 292, and/or the example monitors 294 and/or 296 is/are hereby expressly defined to include a non-transitory computer readable storage device or storage disk such as a memory, a digital versatile disk (DVD), a compact disk (CD), a Blu-ray disk, etc. including the software and/or firmware. Further still, the example predictive wireless feedback control system 200 of FIGS. 2-5 may include one or more elements, processes and/or devices in addition to, or instead of, those illustrated in FIGS. 2-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
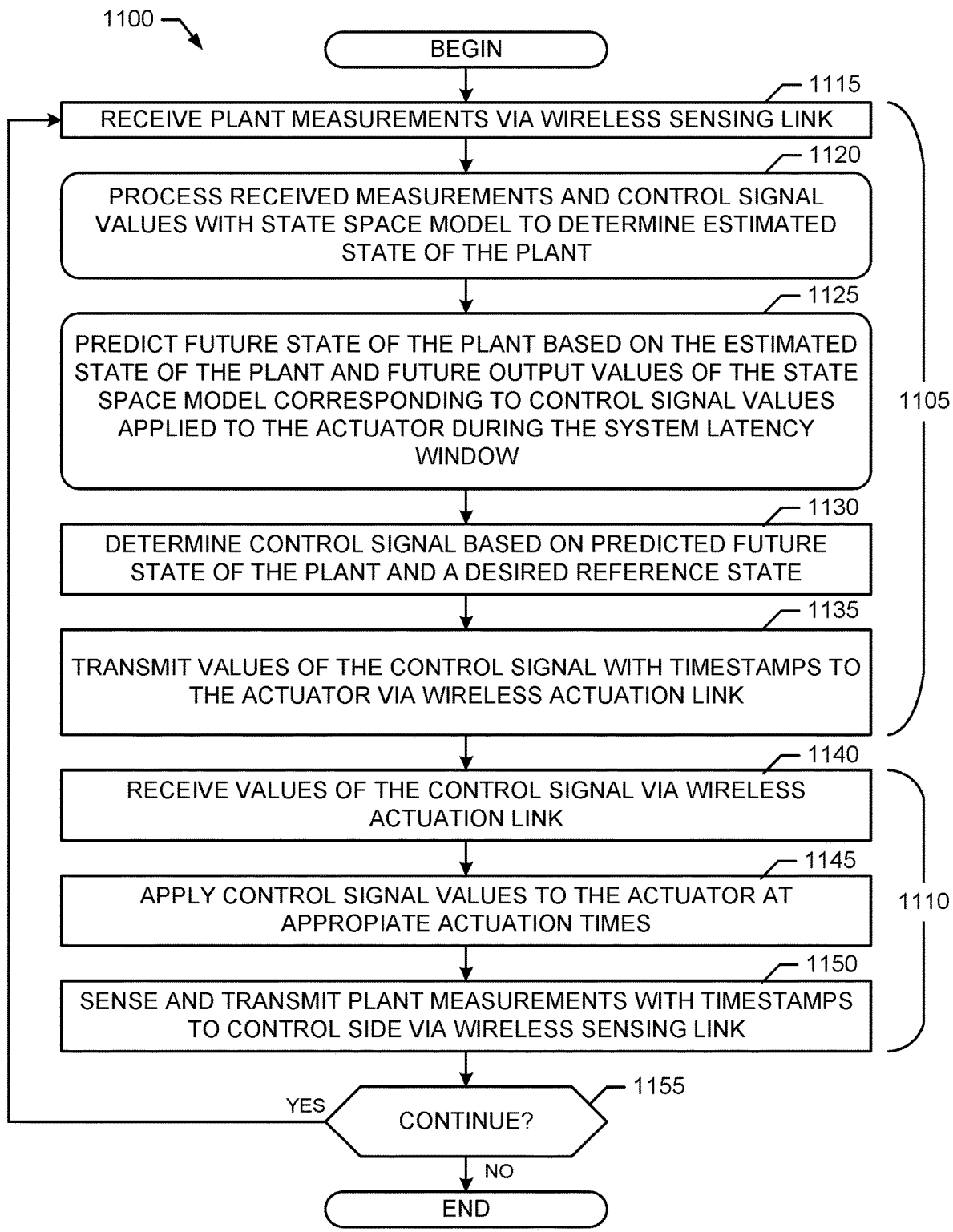
FIG. 11 is a flowchart representative of example computer readable instructions that may be executed to implement the example predictive wireless feedback control system of FIG. 2.
Figure 12:
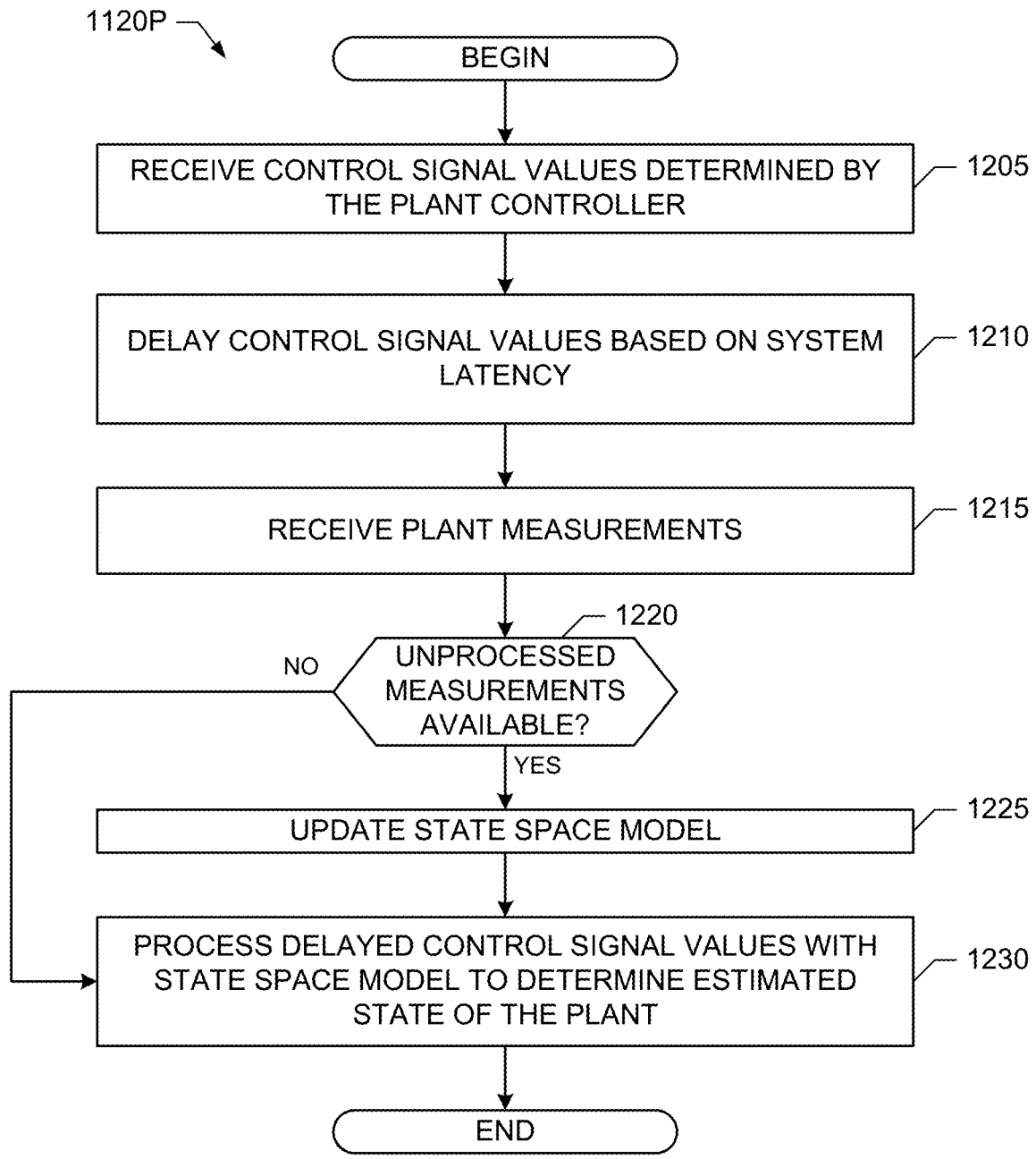
FIG. 12 is a flowchart representative of example computer readable instructions that may be executed to implement the example observer of FIGS. 2, 3 and/or 4.
Figure 13:
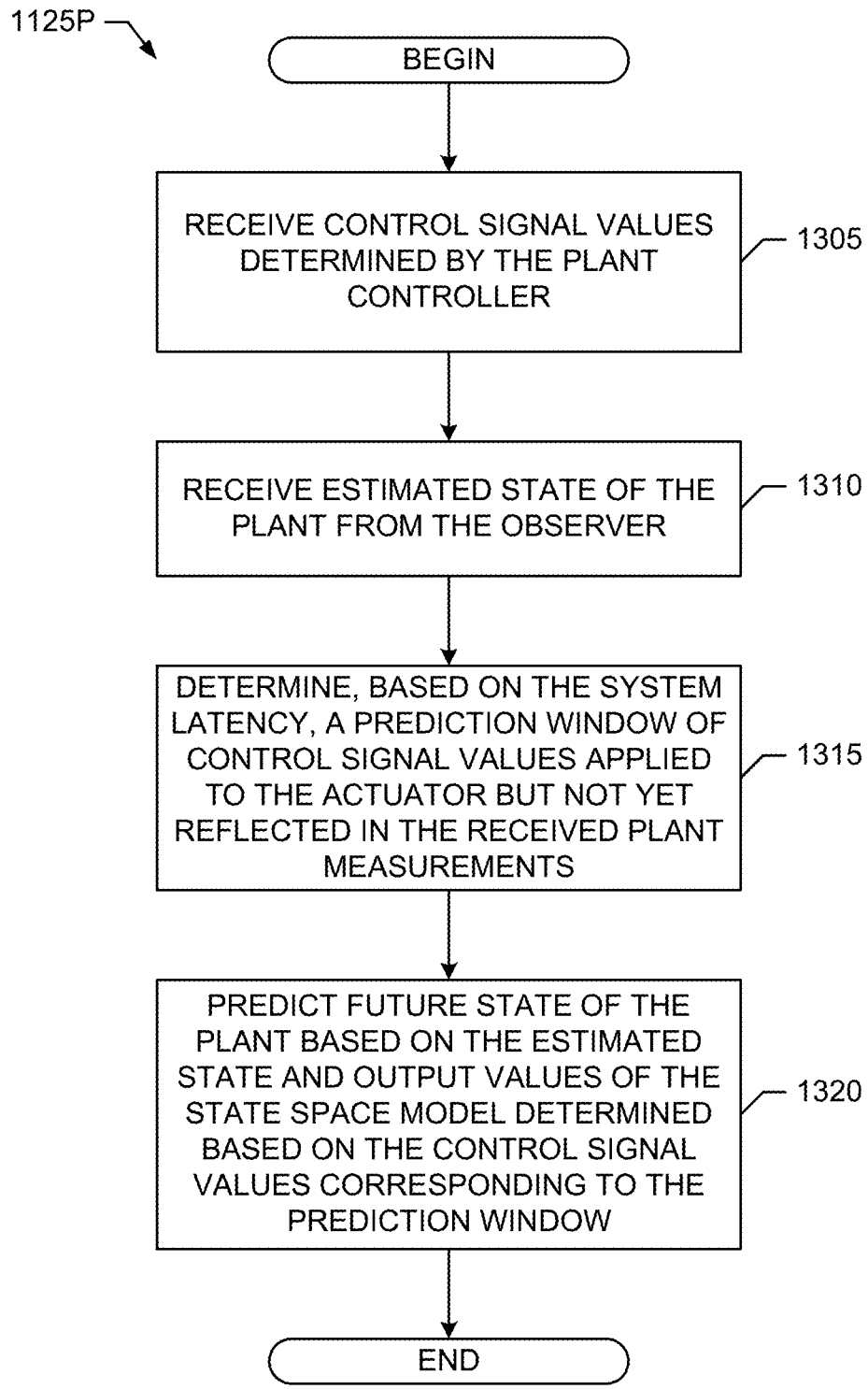
FIG. 13 is a flowchart representative of example computer readable instructions that may be executed to implement the example predictor of FIGS. 2, 3 and/or 5.

Flowcharts representative of example hardware logic, machine readable instructions, hardware implemented state machines, and/or any combination thereof for implementing the predictive wireless feedback control system 200 are shown in FIGS. 11-13, respectively. In these examples, the machine readable instructions may be one or more executable programs or portion(s) of an executable program for execution by a computer processor, such as the processors 1412 and/or 1512 shown in the example processor platform 1400 discussed below in connection with FIGS. 14 and/or 15. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processors 1412 and/or 1512, but the entire program or programs and/or parts thereof could alternatively be executed by a device other than the processors 1412 and/or 1512, and/or embodied in firmware or dedicated hardware. Further, although the example program(s) is(are) described with reference to the flowcharts illustrated in FIGS. 11-13, many other methods of implementing the example predictive wireless feedback control system 200 may alternatively be used. For example, with reference to the flowcharts illustrated in FIGS. 11-13, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 11-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 1100 that may be executed to implement the example predictive wireless feedback control system 200 of FIGS. 2-5 is represented by the flowchart shown in FIG. 11. The example program 1100 implements both example control-side processing 1105 associated with the control side 210 of the predictive wireless feedback control system 200, and example target-side processing 1110 associated with the target side 205 of the predictive wireless feedback control system 200. With reference to the preceding figures and associated written descriptions, the example program 1100 begins execution at block 1105 at which the example observer 240 obtains measurements of the target system 215 (e.g., as sensed by the example sensor(s) 225) via the WSL 262 (e.g., received by the example control-side receiver 250 from the example target-side transmitter 256), as described above. At block 1120, the observer processes the received measurements and control signal values output from the example controller 235 with an example state space model of the target system 215 to determine an estimated state of the target system 215, as described above. An example program for implementing the processing at block 1120 is described below in connection with FIG. 12.

At block 1125, the example predictor 245 predicts, as described above, a future state of the target system based on the estimated state of the target system determined at block 1120, and future output values of the state space model of the target system 215. As described above, the future output values are determined by evaluating the state space model with values of the control signal determined by the controller 235 for application to the actuator 220 during a system latency window beginning at a time associated with the estimated state of the target system 215 and having a duration corresponding to (e.g., the summation of) the sensing link latency $\tau_s$, associated with the WSL 262, and the upper limit of the expected actuation link latency $\tau_{a,MAX}$ associated with the WAL 264. An example program for implementing the processing at block 1125 is described below in connection with FIG. 13.

At block 1130, the controller 235 determines control signal values based on the predicted future state of the target system 215 obtained at block 1125 and a desired reference state of the target system 215, as described above. At block 1135, the controller 235 transmits the control signal values via the WSL 262 (e.g., transmitted by the example control-side transmitter 252 to the example target-side receiver 254) to the actuator 220, as described above. At block 1140, the actuator 220 receives the control signal values and, at block 1145, the actuator 220 operates on the control signal values at the appropriate time, as described above. At block 1150, the sensor(s) 225 determine new measurements of the target system 215 and transmit the measurement via the WSL 262 to the control side 210 of the predictive wireless feedback control system 200, as described above, thereby completing the predictive wireless feedback control loop until processing is no longer to continue (block 1150).

An example program 1120P that may be executed to implement the processing at block 1120 of FIG. 11, and/or the example observer 240 of FIGS. 2, 3 and/or 4, is represented by the flowchart shown in FIG. 12. With reference to the preceding figures and associated written descriptions, the example program 1120P begins execution at block 1205 at which the example control signal receiver 410 of the observer 240 receives the control signal values determined by the controller 235, as described above. At block 1210, the example control signal delayer 415 of the observer 240 delays the control signal values based on the sensing link latency $\tau_s$ associated with the WSL 262 and the maximum expected latency $\tau_{a,MAX}$ associated with the WAL 264, as described above. At block 1215, the example measurement receiver 420 of the observer 240 receives the measurement values contained in sensor messages 260, which were received by the control-side receiver 250 via the WSL 262, as described above. At block 1220, the example model updater 425 of the observer 240 determines whether unprocessed measurement values are available. If unprocessed measurement values are available, processing proceeds to block 1225; otherwise processing proceeds to block 1230. At block 1225, the model updater 425 updates the state space model of the target system 215 based on the unprocessed measurements, as described above. At block 1230, the example state space model evaluator 405 of the observer 240 processed the delayed control signal values with the state space model to determine the estimated state of the target system 215, as described above.

An example program 1125P that may be executed to implement the processing at block 1125 of FIG. 11, and/or the example predictor 245 of FIGS. 2, 3 and/or 5, is represented by the flowchart shown in FIG. 13. With reference to the preceding figures and associated written descriptions, the example program 1125P begins execution at block 1305 at which the example control signal receiver 515 of the predictor 245 receives control signal values determined by the controller 235, as described above. At block 1310, the example state space model receiver 505 of the predictor 245 receives the estimated state values of the target system 215, as well as the state space model, from the observer 240. At block 1315, the example time advance calculator 520 of the predictor 245 determines (e.g., based on the sensing link latency $\tau_s$. associated with the WSL 262 and the upper limit of the expected actuation link latency $\tau_{a,MAX}$ associated with the WWAL 264) the prediction time window of control signal values that have been applied to the actuator 220 but are not yet reflected in the received measurements of the target system, as described above. At block 1320, the example state space model forecaster 510 of the predictor 245 predicts, as described above, the future state of the target system 215 based on the estimated state obtained at block 1310 and output values of the state space model determined based on the control signal values corresponding to the prediction time window determined at block 1315.

Figure 14:
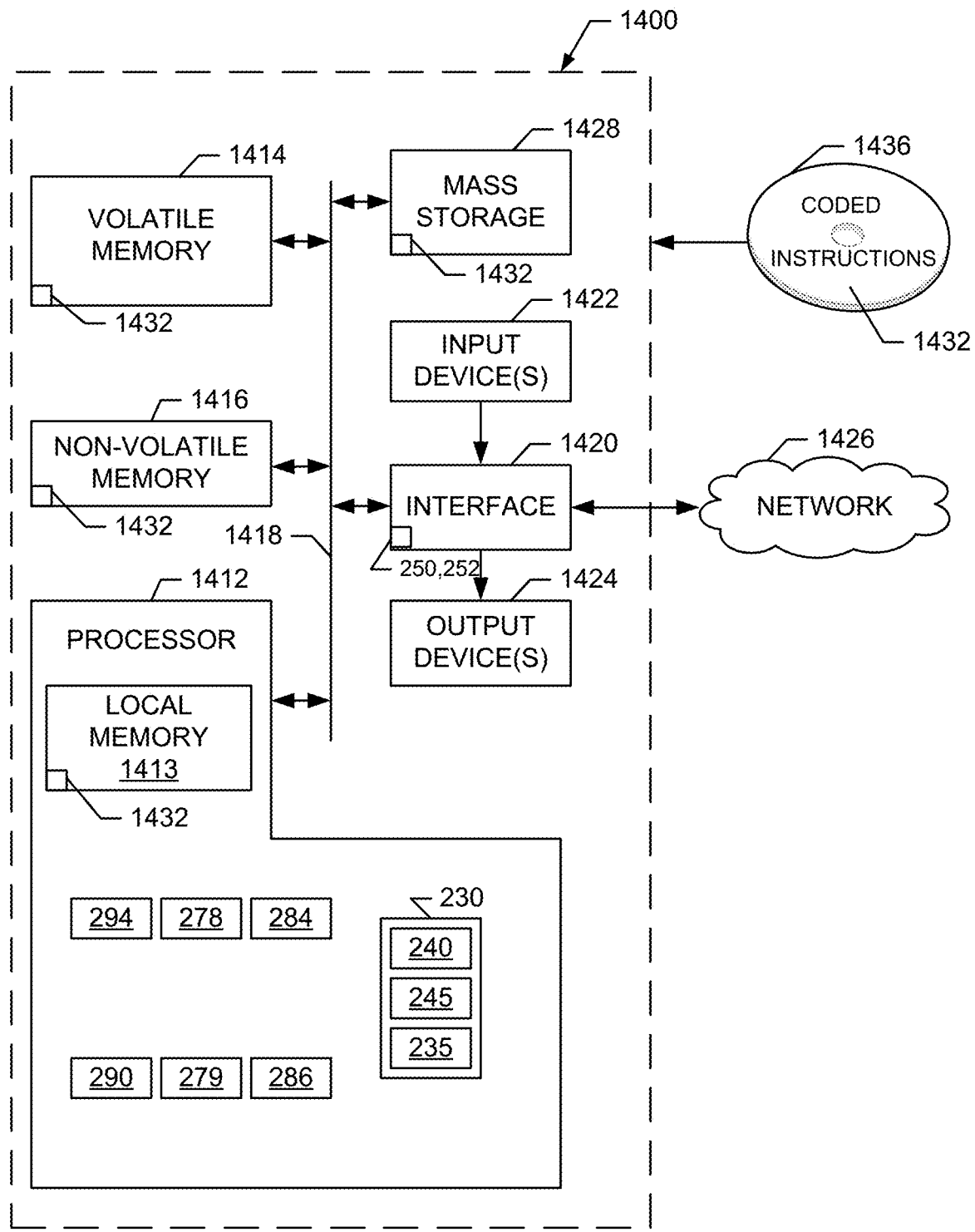
FIG. 14 is a block diagram of an example processor platform structured to execute the example computer readable instructions of FIGS. 11, 12 and/or 13 to implement control-side processing in the example predictive wireless feedback control system of FIG. 2.

FIG. 14 is a block diagram of an example processor platform 1400 structured to execute the instructions of FIGS. 11, 12 and/or 13 to implement control side processing in the example predictive wireless feedback control system 200 of FIGS. 2-5. The processor platform 1400 can be, for example, a server, a personal computer, a workstation, a self-learning machine (e.g., a neural network), a mobile device (e.g., a cell phone, a smart phone, a tablet such as an iPad™), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor 1412 may be a semiconductor based (e.g., silicon based) device. In this example, the processor 1412 implements the example predictive feedback control solution 230, the example controller 235, the example observer 240, the example predictor 245, the example control-side receiver 250, the example control-side transmitter 252, the example MAC synchronizers 278 and 279, the example receive timestamper 284, the example transmit timestamper 286, the example scheduler 290 and the example monitor 294.

The processor 1412 of the illustrated example includes a local memory 1413 (e.g., a cache). The processor 1412 of the illustrated example is in communication with a main memory including a volatile memory 1414 and a non-volatile memory 1416 via a link 1418. The link 1418 may be implemented by a bus, one or more point-to-point connections, etc., or a combination thereof. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1400, can allow the user to control the computer system and provide data to the computer using physical gestures, such as, but not limited to, hand or body movements, facial expressions, and face recognition.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426, such as the WTSN 260. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1420 implements the example control-side receiver 250 and the example control-side transmitter 252.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 corresponding to the instructions of FIGS. 11, 12 and/or 13 may be stored in the mass storage device 1428, in the volatile memory 1414, in the non-volatile memory 1416, in the local memory 1413 and/or on a removable non-transitory computer readable storage medium, such as a CD or DVD 1436.

Figure 15:
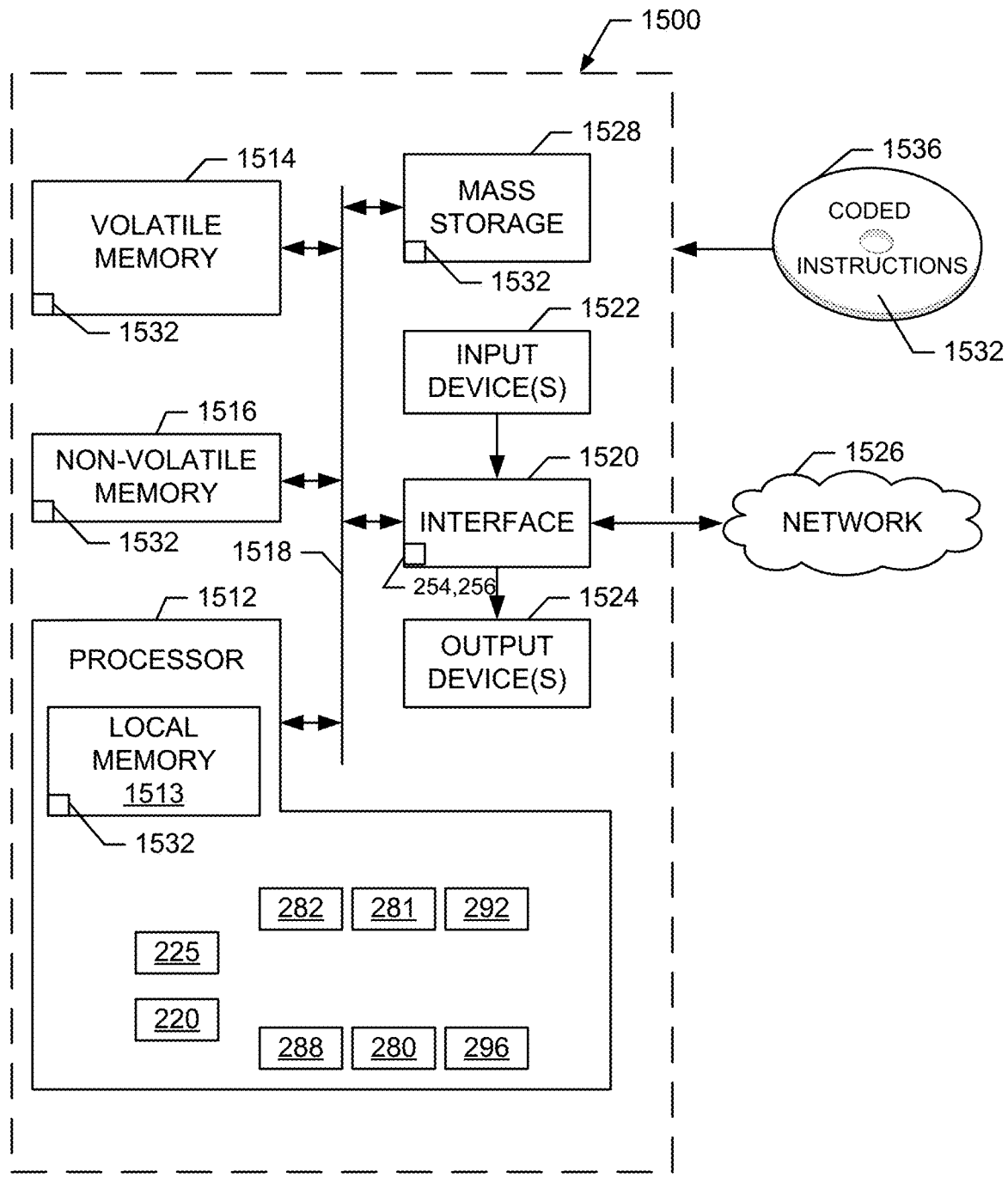
FIG. 15 is a block diagram of an example processor platform structured to execute the example computer readable instructions of FIG. 11 to implement target-side processing in the example predictive wireless feedback control system of FIG. 2.

FIG. 15 is a block diagram of an example processor platform 1500 structured to execute the instructions of FIG. 11 to implement target side processing in the example predictive wireless feedback control system 200 of FIGS. 2-3. The processor platform 1500 can be, for example, a server, a personal computer, a workstation, a self-learning machine (e.g., a neural network), a mobile device (e.g., a cell phone, a smart phone, a tablet such as an iPad™), or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor 1512 may be a semiconductor based (e.g., silicon based) device. In this example, the processor 1512 implements the example actuator 220, the example sensors 225, the example MAC synchronizers 280 and 281, the example transmit timestamper 282, the example receive timestamper 288, the example scheduler 292 and the example monitor 296.

The processor 1512 of the illustrated example includes a local memory 1513 (e.g., a cache). The processor 1512 of the illustrated example is in communication with a main memory including a volatile memory 1514 and a non-volatile memory 1516 via a link 1518. The link 1518 may be implemented by a bus, one or more point-to-point connections, etc., or a combination thereof. The volatile memory 1514 may be implemented by SDRAM, DRAM, RDRAM® and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a USB, a Bluetooth® interface, an NFC interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1500, can allow the user to control the computer system and provide data to the computer using physical gestures, such as, but not limited to, hand or body movements, facial expressions, and face recognition.

One or more output devices 1524 are also connected to the interface circuit 1520 of the illustrated example. The output devices 1524 can be implemented, for example, by display devices (e.g., an LED, an OLED, an LCD, a CRT display, an IPS display, a touchscreen, etc.), a tactile output device, a printer and/or speakers(s). The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526, such as the WTSN 260. The communication can be via, for example, an Ethernet connection, a DSL connection, a telephone line connection, a coaxial cable system, a satellite system, a line-of-site wireless system, a cellular telephone system, etc. In this example, the interface circuit 1520 implements the example target-side receiver 254 and the example target-side transmitter 256.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and DVD drives.

The machine executable instructions 1532 corresponding to the instructions of FIG. 11 may be stored in the mass storage device 1528, in the volatile memory 1514, in the non-volatile memory 1516, in the local memory 1513 and/or on a removable non-transitory computer readable storage medium, such as a CD or DVD 1536.

From the foregoing, it will be appreciated that example methods, apparatus, systems and articles of manufacture (e.g., physical storage media) to implement predictive wireless feedback control loops have been disclosed. Disclosed examples improve the efficiency of using a computing device by enabling use of wireless networks to perform feedback control of target systems that are latency-sensitive and/or reliability-sensitive. Disclosed examples are accordingly directed to one or more improvement(s) in the functioning of a computer.

The foregoing disclosure provides example solutions to implement predictive wireless feedback control loops. The following further examples, which include subject matter such as a predictive wireless feedback control system, a non-transitory computer readable medium including instructions that, when executed, cause at least one processor to implement predictive wireless feedback control loops, and a predictive wireless feedback control method, are disclosed herein. The disclosed examples can be implemented individually and/or in one or more combinations.

Example 1 is a predictive wireless feedback control system including a receiver to receive measurements of a controlled system via a first wireless link. The predictive wireless feedback control system of example 1 also includes an observer to output estimated values of states of the controlled system based on a state space model of the controlled system, the state space model updated based on the measurements. The predictive wireless feedback control system of example 1 further includes a predictor to: (i) predict future values of the states of the controlled system based on the estimated values of the states of the controlled system from the observer, a first latency of the first wireless link and an upper limit of a second latency associated with a second wireless link, the second wireless link to communicate values of a control signal to an actuator associated with the controlled system; and (ii) output the predicted future values of the states of the controlled system to a controller that is to determine the control signal that is to be communicated via the second wireless link.

Example 2 includes the subject matter of example 1, wherein the first wireless link and the second wireless link are implemented by a wireless time sensitive network that is to provide time synchronization between the receiver and a transmitter that is to transmit the measurements of the controlled system to the receiver via the first wireless link.

Example 3 includes the subject matter of example 2, wherein the measurements include a first measurement, the receiver is to receive the first measurement in a first message from the transmitter via the first wireless link, the first message to include a timestamp to identify a first time at which the transmitter transmitted the first message, the receiver to determine a second timestamp to identify a second time at which the receiver received the first message, and at least one of the observer or the predictor to determine the first latency based on the first timestamp and the second timestamp.

Example 4 includes the subject matter of example 3, wherein the upper limit of the second latency associated with the second wireless link is a configuration parameter based on the wireless time sensitive network.

Example 5 includes the subject matter of any one of examples 1 to 4, wherein the observer is to determine whether unprocessed measurements are available at a time when the state space model is to be updated. If the unprocessed measurements are available, the observer of example 5 is to (i) determine error values based on differences between observed values of the controlled system and the corresponding estimated values of the states of the controlled system, the observed values of the controlled system based on the unprocessed measurements, and (ii) update the state space model based on the error values. If the unprocessed measurements are not available, the observer of example 5 is to not update the state space model.

Example 6 includes the subject matter of any one of examples 1 to 5, wherein the predictor is to predict the future values of the states of the controlled system based on the estimated values of the states of the controlled system and output values of the state space model, the output values of the state space model determined based on values of the control signal determined by the controller for application to the actuator during a window of time starting at a first time associated with a most recent measurement of the controlled system from the first wireless link, the window of time to have a duration corresponding to a sum of the first latency of the first wireless link and the upper limit of the second latency associated with the second wireless link.

Example 7 includes the subject matter of any one of examples 1 to 6, wherein the receiver is a first receiver, and further including a transmitter to transmit the values of the control signal to the actuator via the second wireless link, the transmitter including a scheduler to adjust a number of retries to be performed to transmit messages including the values of the control signal via the second wireless link, the scheduler to adjust the number of retries based on transmission errors reported by a second receiver that is to receive the messages.

Example 8 includes the subject matter of any one of examples 1 to 7, and further includes the controller, the controller to implement a proportional, derivative and integral control algorithm based on corresponding proportional, derivative and integral control coefficients, the controller to determine values of the proportional, derivative and integral control coefficients based on a function that is to raise a magnitude of an error by an exponent, the error based on the predicted future values of the states of the controlled system and a reference state of the controlled system.

Example 9 is a predictive wireless feedback control system including means for estimating values of states of a controlled system based on a state space model of the controlled system, the state space model updated based on measurements of the controlled system, the measurements to be obtained via a first wireless link. The predictive wireless feedback control system of example 9 also includes means for predicting future values of the states of the controlled system based on the estimated values of the states of the controlled system, a first latency of the first wireless link and an upper limit of a second latency associated with a second wireless link, the second wireless link to communicate values of a control signal to an actuator associated with the controlled system, the means for predicting the future values to output the predicted future values of the states of the controlled system to controller means, the controller means to determine the control signal that is to be communicated via the second wireless link.

Example 10 includes the subject matter of example 9, wherein the means for estimating is to determine whether unprocessed measurements are available at a time when the state space model is to be updated. If the unprocessed measurements are available, the means for estimating of example 10 is to (i) determine error values based on differences between observed values of the controlled system and the corresponding estimated values of the states of the controlled system, the observed values of the controlled system based on the unprocessed measurements, and (ii) update the state space model based on the error values. If the unprocessed measurements are not available, the means for estimating of example 10 is to not update the state space model.

Example 11 includes the subject matter of example 9 or example 10, wherein the means for predicting is to predict the future values of the states of the controlled system based on the estimated values of the states of the controlled system and output values of the state space model, the output values of the state space model determined based on values of the control signal determined by the controller for application to the actuator during a window of time starting at a first time associated with a most recent measurement of the controlled system from the first wireless link, the window of time to have a duration corresponding to a sum of the first latency of the first wireless link and the upper limit of the second latency associated with the second wireless link.

Example 12 includes the subject matter of any one of examples 9 to 11, and further includes scheduling means for adjusting a number of retries to be performed to transmit messages including the values of the control signal via the second wireless link, the scheduling means to adjust the number of retries based on reported transmission errors.

Example 13 includes the subject matter of any one of examples 9 to 12, and further includes the controller means, the controller means to implement a proportional, derivative and integral control algorithm based on corresponding proportional, derivative and integral control coefficients, the controller means to determine values of the proportional, derivative and integral control coefficients based on a function that is to raise a magnitude of an error by an exponent, the error based on the predicted future values of the states of the controlled system and a reference state of the controlled system.

Example 14 is a non-transitory computer readable medium including computer readable instructions which, when executed, cause at least one processor to at least: (i) estimate values of states of a controlled system based on a state space model of the controlled system, the state space model updated based on measurements of the controlled system, the measurements to be obtained via a first wireless link; (ii) predict future values of the states of the controlled system based on the estimated values of the states of the controlled system, a first latency of the first wireless link and an upper limit of a second latency associated with a second wireless link, the second wireless link to communicate values of a control signal to an actuator associated with the controlled system; and (iii) output the predicted future values of the states of the controlled system to a controller that is to determine the control signal that is to be communicated via the second wireless link.

Example 15 includes the subject matter of example 14, wherein the measurements include a first measurement included in a first message, the first message includes a timestamp to identify a first time at which the first message was transmitted, and the computer readable instructions, when executed, cause the at least one processor to determine the first latency based on the first timestamp and a second timestamp, the second timestamp to identify a second time at which the first message was received.

Example 16 includes the subject matter of example 15, wherein the upper limit of the second latency associated with the second wireless link is a configuration parameter based on a wireless time sensitive network that is to implement the second wireless link.

Example 17 includes the subject matter of any one of examples 14 to 16, wherein the computer readable instructions, when executed, cause the at least one processor to: (i) determine whether unprocessed measurements are available at a time when the state space model is to be updated; (ii) if the unprocessed measurements are available, determine error values based on differences between observed values of the controlled system and the corresponding estimated values of the states of the controlled system, the observed values of the controlled system based on the unprocessed measurements, and update the state space model based on the error values; and (iii) if the unprocessed measurements are not available, not update the state space model.

Example 18 includes the subject matter of any one of examples 14 to 17, wherein the computer readable instructions, when executed, cause the at least one processor to predict the future values of the states of the controlled system based on the estimated values of the states of the controlled system and output values of the state space model, the output values of the state space model determined based on values of the control signal determined by the controller for application to the actuator during a window of time starting at a first time associated with a most recent measurement of the controlled system from the first wireless link, the window of time to have a duration corresponding to a sum of the first latency of the first wireless link and the upper limit of the second latency associated with the second wireless link.

Example 19 includes the subject matter of any one of examples 14 to 18, wherein the computer readable instructions, when executed, further cause the at least one processor to adjust, based on reported transmission errors, a number of retries to be performed to transmit messages including the values of the control signal via the second wireless link.

Example 20 is a predictive wireless feedback control method including obtaining measurements of a controlled system via a first wireless link, and estimating, by executing an instruction with at least one processor, values of states of the controlled system based on a state space model of the controlled system, the state space model updated based on the measurements. The method of example 20 also includes predicting, by executing an instruction with at least one processor, future values of the states of the controlled system based on the estimated values of the states of the controlled system, a first latency of the first wireless link and an upper limit of a second latency associated with a second wireless link, the second wireless link to communicate values of a control signal to an actuator associated with the controlled system. The method of example 20 further includes outputting the predicted future values of the states of the controlled system to a controller that is to determine the control signal that is to be communicated via the second wireless link.

Example 21 includes the subject matter of example 20, wherein the measurements include a first measurement included in a first message, the first message includes a timestamp to identify a first time at which the first message was transmitted, and further including determining the first latency based on the first timestamp and a second timestamp, the second timestamp identifying a second time at which the first message was received.

Example 22 includes the subject matter of example 21, wherein the upper limit of the second latency associated with the second wireless link is a configuration parameter based on a wireless time sensitive network that is to implement the second wireless link.

Example 23 includes the subject matter of example 21 or example 22, and further includes (i) determining whether unprocessed measurements are available at a time when the state space model is to be updated; (ii) if the unprocessed measurements are available, determining error values based on differences between observed values of the controlled system and the corresponding estimated values of the states of the controlled system, the observed values of the controlled system based on the unprocessed measurements, and updating the state space model based on the error values; and (iii) if the unprocessed measurements are not available, not updating the state space model.

Example 24 includes the subject matter of any one of examples 20 to 23, and further includes predicting the future values of the states of the controlled system based on the estimated values of the states of the controlled system and output values of the state space model, the output values of the state space model determined based on values of the control signal determined by the controller for application to the actuator during a window of time starting at a first time associated with a most recent measurement of the controlled system from the first wireless link, the window of time to have a duration corresponding to a sum of the first latency of the first wireless link and the upper limit of the second latency associated with the second wireless link.

Example 25 includes the subject matter of any one of examples 20 to 24, and further includes adjusting, based on reported transmission errors, a number of retries to be performed to transmit messages including the values of the control signal via the second wireless link.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
at least one memory;
instructions; and
processor circuitry to execute the instructions to at least:
obtain one or more estimated states of a controlled system based on a model of the controlled system, the model based on measurements of the controlled system, the measurements associated with a first latency value;
determine one or more predicted future states of the controlled system based on (i) the one or more estimated states of the controlled system, (ii) the first latency value and (iii) a second latency value associated with a control signal to be provided to an actuator associated with the controlled system; and
output the one or more predicted future states of the controlled system to a controller that is to determine the control signal.

2. The apparatus of claim 1, wherein the processor circuitry is to obtain the measurements via a first communication link, the control signal is to be provided to the actuator via a second communication link, the first latency value is based on the first communication link, and the second latency value is based on the second communication link.

3. The apparatus of claim 2, wherein the processor circuitry is to:
obtain a first message via the first communication link, the first message including at least one of the measurements;
determine the first latency value based on a timestamp included in the first message; and
determine the second latency value based on an upper limit of a latency associated with the second communication link.

4. The apparatus of claim 3, wherein the first communication link and the second communication link are implemented by a wireless time sensitive network, and the upper limit of the latency associated with the second communication link is based on the wireless time sensitive network.

5. The apparatus of claim 1, wherein the processor circuitry is to determine the one or more predicted future states of the controlled system based on (i) the one or more estimated states of the controlled system, (ii) the first latency value, (iii) the second latency value, and (iv) values of the control signal to be provided to the actuator during a window of time.

6. The apparatus of claim 5, wherein the window of time has a start time and a duration, the start time corresponding to a most recent measurement obtained for the controlled system, the duration corresponding to a sum of the first latency value and the second latency value.

7. The apparatus of claim 1, wherein the processor circuitry is to implement the controller based on a proportional, derivative and integral control algorithm.

8. At least one non-transitory computer readable medium comprising computer readable instructions that, when executed, cause one or more processors to at least:
obtain one or more estimated states of a controlled system based on a model of the controlled system, the model based on measurements of the controlled system, the measurements associated with a first latency value;
determine one or more predicted future states of the controlled system based on (i) the one or more estimated states of the controlled system, (ii) the first latency value and (iii) a second latency value associated with a control signal to be provided to an actuator associated with the controlled system; and
output the one or more predicted future states of the controlled system to a controller that is to determine the control signal.

9. The at least one non-transitory computer readable medium of claim 8, wherein the instructions are to cause the one or more processors to obtain the measurements via a first communication link, the control signal is to be provided to the actuator via a second communication link, the first latency value is based on the first communication link, and the second latency value is based on the second communication link.

10. The at least one non-transitory computer readable medium of claim 9, wherein the instructions are to cause the one or more processors to:
obtain a first message via the first communication link, the first message including at least one of the measurements;
determine the first latency value based on a timestamp included in the first message; and
determine the second latency value based on an upper limit of a latency associated with the second communication link.

11. The at least one non-transitory computer readable medium of claim 8, wherein the instructions are to cause the one or more processors to determine the one or more predicted future states of the controlled system based on (i) the one or more estimated states of the controlled system, (ii) the first latency value, (iii) the second latency value, and (iv) values of the control signal to be provided to the actuator during a window of time.

12. The at least one non-transitory computer readable medium of claim 11, wherein the window of time has a start time and a duration, the start time corresponding to a most recent measurement obtained for the controlled system, the duration corresponding to a sum of the first latency value and the second latency value.

13. The at least one non-transitory computer readable medium of claim 8, wherein the instructions are to cause the one or more processors to implement the controller based on a proportional, derivative and integral control algorithm.

14. A method comprising:
obtaining one or more estimated states of a controlled system based on a model of the controlled system, the model based on measurements of the controlled system, the measurements associated with a first latency value;
determining, by executing an instruction with at least one processor, one or more predicted future states of the controlled system based on (i) the one or more estimated states of the controlled system, (ii) the first latency value and (iii) a second latency value associated with a control signal to be provided to an actuator associated with the controlled system; and
outputting the one or more predicted future states of the controlled system to a controller that is to determine the control signal.

15. The method of claim 14, further including obtaining the measurements via a first communication link, wherein the control signal is to be provided to the actuator via a second communication link, the first latency value is based on the first communication link, and the second latency value is based on the second communication link.

16. The method of claim 15, further including:
obtaining a first message via the first communication link, the first message including at least one of the measurements;
determining the first latency value based on a timestamp included in the first message; and
determining the second latency value based on an upper limit of a latency associated with the second communication link.

17. The method of claim 16, wherein the first communication link and the second communication link are implemented by a wireless time sensitive network, and the upper limit of the latency associated with the second communication link is based on the wireless time sensitive network.

18. The method of claim 14, wherein the determining of the one or more predicted future states of the controlled system is based on (i) the one or more estimated states of the controlled system, (ii) the first latency value, (iii) the second latency value, and (iv) values of the control signal to be provided to the actuator during a window of time.

19. The method of claim 18, wherein the window of time has a start time and a duration, the start time corresponding to a most recent measurement obtained for the controlled system, the duration corresponding to a sum of the first latency value and the second latency value.

20. The method of claim 14, further including implementing the controller based on a proportional, derivative and integral control algorithm.

* * * * *

UNITED STATES PATENT AND TRADEMARK OFFICE
CERTIFICATE OF CORRECTION

PATENT NO. : 11,778,573 B2
APPLICATION NO. : 17/479829
DATED : October 3, 2023
INVENTOR(S) : Osuna Ibarra et al.

It is certified that error appears in the above-identified patent and that said Letters Patent is hereby corrected as shown below:

In the Drawings

Sheet 11, FIG. 11, under reference numeral 1145, replace "APPROPIATE" with -- APPROPRIATE --

Signed and Sealed this
Thirteenth Day of February, 2024

*Katherine Kelly Vidal*

Katherine Kelly Vidal
*Director of the United States Patent and Trademark Office*